(12) United States Patent
Kornienko et al.

(10) Patent No.: US 11,954,746 B1
(45) Date of Patent: Apr. 9, 2024

(54) SYSTEMS AND METHODS OF ASSESSING VIABILITY OF REAL ESTATE ENTITIES

(71) Applicant: Federal Home Loan Mortgage Corporation (Freddie Mac), McLean, VA (US)

(72) Inventors: Stanislav Kornienko, McLean, VA (US); Fabio Quijada, Reston, VA (US); Brendan McKinley, Vienna, VA (US); Evelyn Suzette Johnson, Fairfax, VA (US); Angela Rae Macias Helgeson, Honolulu, HI (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 203 days.

(21) Appl. No.: 16/419,495

(22) Filed: May 22, 2019

(51) Int. Cl.
| | |
|---|---|
| *G06Q 50/16* | (2012.01) |
| *G06F 16/28* | (2019.01) |
| *G06Q 10/0635* | (2023.01) |
| *G06Q 30/02* | (2023.01) |
| *G06Q 40/03* | (2023.01) |

(52) U.S. Cl.
CPC .......... *G06Q 50/16* (2013.01); *G06F 16/288* (2019.01); *G06Q 10/0635* (2013.01); *G06Q 30/0278* (2013.01); *G06Q 40/03* (2023.01)

(58) Field of Classification Search
CPC ............... G06Q 50/16; G06Q 10/0635; G06Q 30/0278; G06Q 40/025; G06F 16/288
See application file for complete search history.

(56) References Cited

U.S. PATENT DOCUMENTS

| | | | | |
|---|---|---|---|---|
| 2011/0125672 | A1* | 5/2011 | Rosenthal | G06Q 40/08 705/36 R |
| 2013/0103597 | A1* | 4/2013 | Fout | G06Q 30/02 705/313 |
| 2014/0201063 | A1* | 7/2014 | Snell | G06F 16/287 705/38 |
| 2015/0170269 | A1* | 6/2015 | Bradley | G06Q 50/16 705/7.29 |
| 2017/0365019 | A1* | 12/2017 | He | G06F 16/9038 |

(Continued)

OTHER PUBLICATIONS

A systematic review of smart real estate technology: Drivers of, and barriers to, the use of digital disruptive technologies and online platforms; Ullah et al.; 2018 (Year: 2018).*

*Primary Examiner* — Brian M Epstein
*Assistant Examiner* — Francis Z. Santiago Merced
(74) *Attorney, Agent, or Firm* — Gardella Grace P.A.

(57) ABSTRACT

In an illustrative embodiment, an automated system assesses risks associated with real estate entities. The system may include computing systems and devices for extracting data attributes for real estate entities from received source data, and the extracted data attributes may each be associated with a particular data level for a real estate entity. The system can link data attributes in adjacent data levels with unique linkage information and compute metrics for each of the real estate entities from the data attributes where each computed metric may be associated with one of the data levels. The system can assess an amount of risk associated with each of the real estate entities based on the computed metrics and present the assessed amount of risk for one or more real estate entities to a remote computing device of a user responsive to receiving a risk assessment request.

21 Claims, 13 Drawing Sheets

(56) References Cited

U.S. PATENT DOCUMENTS

2019/0188616 A1\* 6/2019 Urban ................ G06Q 10/0875
2019/0266672 A1\* 8/2019 Hill .................... G06Q 30/0283
2019/0362448 A1\* 11/2019 Yelovitch ............... G06Q 40/03

\* cited by examiner

| | Metric Title | Metric Description |
|---|---|---|
| 402 | Number of Units | Projects with less then 5 units are failed. |
| 404 | Project Completeness | If >=2 appraisers mark a project as complete then a project passes. Project fails if < 2 appraisers say a project is complete or if > 2 say it is incomplete. |
| 406 | Leased Common Elements | At least 2 distinct appraisers (most recent appraisals) indicate common elements are leased and element leased is not parking, or any appraiser indicates parking leased by developer/builder/sponsor, then project fails |
| 408 | HOA Control | Two distinct appraisers need to say developer not in control of HOA. |
| 410 | Number of Remaining projects after % of units sold less than 90% | If Number of Units Sold (Completed Project) divided by [Total] Number of Units >= 90% for at least two distinct appraisals, project passes. |
| 412 | Owner Concentration | If 2 or more distinct appraiser(s), of appraisals dated within last 2 yrs for projects with 21+ units, marked "Yes" that a single entity owns more than 10% of the total units in the project, then project fails. 5-20 unit project where only one appraiser marked "Yes" pass. |
| 414 | Commercial Space | If 2 distinct appraisers marked "Yes" (on most recent appraisal for each appraiser) that there is commercial space in the project & appraisers indicate present land use commercial percent > 25%, project fails. |

| | Metric Title | Metric Description |
|---|---|---|
| 416 | Illegal Zoning | If 2 distinct appraisals marked zoning compliance is "Illegal" then project fails |
| 418 | Tenant Occupation | If 2 distinct appraisers marked primary occupancy as TENANT and declining market or oversupply in last two years, project fails. |
| 420 | Manufactured Homes | If 2 distinct appraisals indicated manufactured homes, project fails. |
| 422 | Pending Litigation | Projects are failed if correct word combinations are found indicating pending litigation. |
| 424 | Time Share | Appraiser commented on timeshare/segmented ownership/tenancy in common (keywords query) (at least one appraiser commented regarding timeshare) |
| 426 | Physical Deficiencies | If >= 10% of units (for 20+ unit projects) were noted as having physical deficiencies by appraisers, then project is failed. 2 units to fail for projects with 5-20 units. |

| | Metric Title | Metric Description |
|---|---|---|
| 430 | Poor Construction Quality Impact on Marketability | >= if 10% of units (for 20+ unit projects) were rated inferior construction quality ratings of Q5/Q6 s by appraisers, then project is failed. 2 units to fail for projects with 5-20 units. |
| 432 | Days on Market vs. MSA | Project fails if 3 or more units are sitting are on the market for sale > than the MSA statistical average of neighboring, equivalent projects. |
| 434 | HOA to Price Ratio | CP Flagged 30 yr Net HOA fee to price > MSA-level Cutoff for over 50% of units |
| 436 | Undervaluation | Project is failed if the %loans undervalued >= 25% AND cumulative % ppty value undervaluation >=15% |
| 438 | Overvaluation | Condo project is failed if % loans overvalued > 50% AND cumulative % ppty value overvaluation >=15% |
| 440 | D90 (90 Day) Delinquency | Condo project failes if 2 loans hit D90+ over last year, regardless if loan active or not, look at last year's loans which have D90 status or worse and if there are at least 2 then fail - not tied to when event started |
| 442 | Cooperative | Condo project fails if flagged as a COOPERATIVE by at least 1 appraiser in last 5 years |
| 444 | Multi-Dwelling | Condo project fails if building address matches supporting forms (72/1025 - small residential income property) and it is not marked as a conversion on appraisal. |
| 446 | Continuing Care Retirement Community (CCRC) | Condo project failed if appraiser commented on CCRC (keywords query) within last five years. |

| | Metric Title | Metric Description |
|---|---|---|
| 448 | CONDOTEL | Condo project fails if it matches to project listed in the SmithBook, UCDP appraisal data, or project name |
| 450 | Special Assessment | Condo project failes if special assessment (SA) is over 20K or SA to price ratio is over 10% |
| 452 | Securities/Investment Contract/ Non-Warrantable | Condo project fails if appraiser commented that a project has a securities/investment contract |
| 454 | Mandatory Member Fees and Dues | Appraiser commented on mandatory membership dues (keywords query) + checked Y on question that there are other fees besides HOA on appraisal |
| 456 | Loan-To-Value (LTV) | Project fails if the count of loans with LTV > 90 is more than half of all the loans in the project |
| 458 | Weighted Repeat Sales Index (WRSI) | Condo project fails if loans depict price growth significantly below the local index >=50% for at least three units |
| 459 | Crowdsourcing | 6 customers have each delivered a long in a project within the last 18 months |
| 460 | Manual Approval | Manual approval based on review of project documentation and available internal and public data |

FIG. 4D

SYSTEMS AND METHODS OF ASSESSING VIABILITY OF REAL ESTATE ENTITIES

SUMMARY OF ILLUSTRATIVE EMBODIMENTS

The present inventors have determined a need for automating the risk assessments of real estate entities, such as condominium (condo) projects, which can automate and streamline origination and approval of loans for units within condo projects. In some embodiments, customers of a government sponsored enterprise (GSE), such as banks or other mortgage lenders, may wish to know whether loans for units within a given condo project are approved for purchase by the GSE, referred to as operational relief. Conventional methods rely upon manual completion and submission of condo project questionnaires by homeowner association (HOA) personnel. In some examples, the HOA personnel may have incomplete knowledge of how to properly complete the questionnaires, which can lead to delays in home loan origination cycles. Further, HOAs often charge fees for completing the condo project questionnaires, which increases time and monetary costs for both borrowers and lenders.

In some embodiments, an automated system assesses risks associated with real estate entities. The system may include computing systems and devices for extracting data attributes for real estate entities from received source data, and the extracted data attributes may each be associated with a particular data level for a real estate entity. The system can link data attributes in adjacent data levels with unique linkage information and compute metrics for each of the real estate entities from the data attributes where each computed metric may be associated with one of the data levels. The system can assess an amount of risk associated with each of the real estate entities based on the computed metrics and present the assessed amount of risk for one or more real estate entities to a remote computing device of a user responsive to receiving a risk assessment request.

The preceding general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 4A-4D show a table of metrics for assessing project risk;

DETAILED DESCRIPTION OF ILLUSTRATIVE EMBODIMENTS

Figure 1:
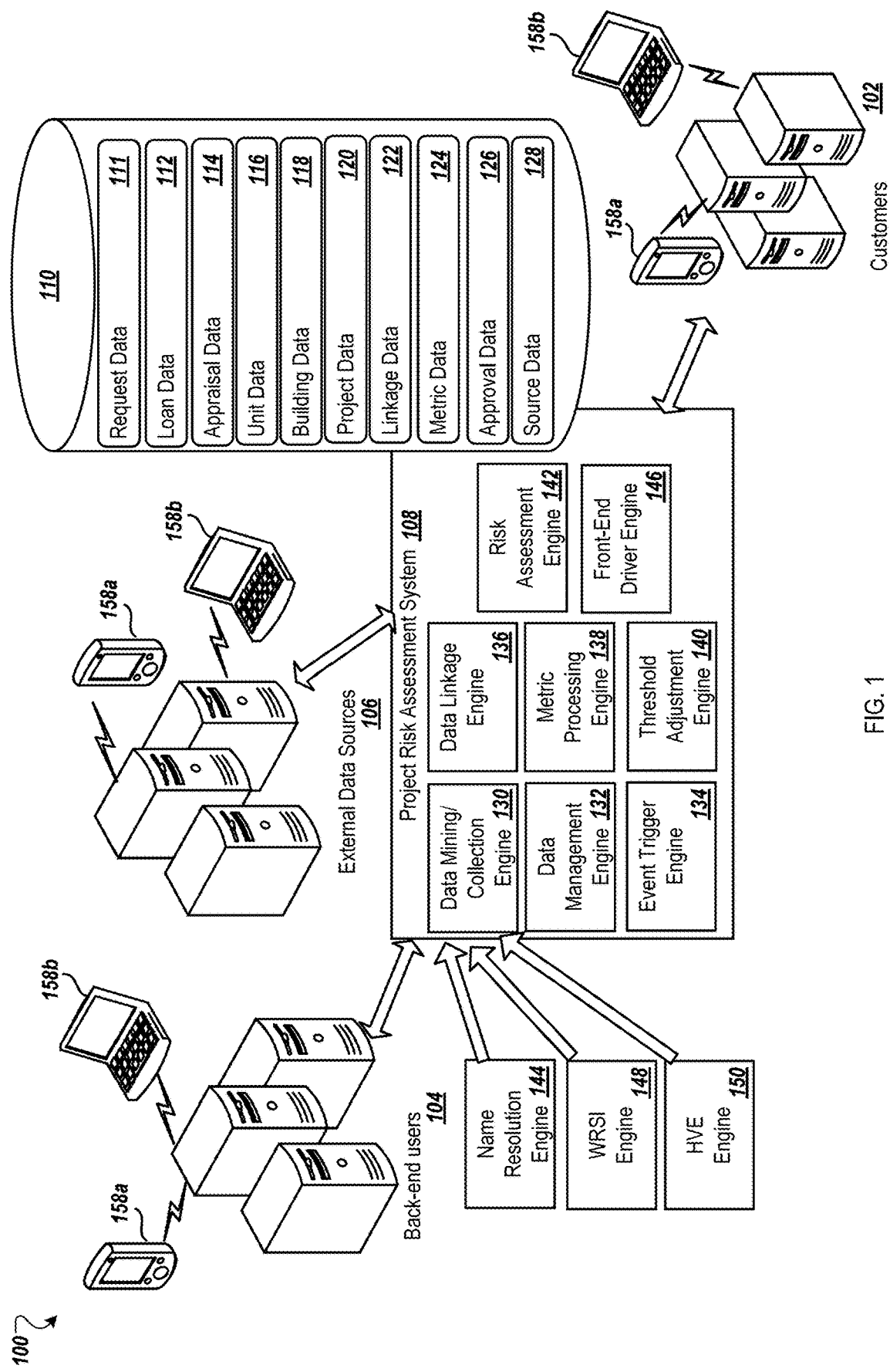
FIG. 1 is an example computing system including software engines in a system for aggregating and linking data for condominium project approval.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure are directed to systems and methods of assessing risk associated with condominium (condo) projects and associating the risk with existing and potential loans. In some implementations, a project risk assessment system extracts attribute data from multiple disparate data sources that contain information related to loans, appraisals, and other attributes of condo projects and units within the condo projects. In some examples, the extracted data attributes can be used to aid in assessing the amount of risk associated with making a loan or purchasing an already existing loan associated with a unit in a particular condo project. In some implementations, the data attributes for a condo project can each be associated with a specific data level that is linked to another data level by unique linkage information. Because the data attributes for a condo project are linked across multiple data levels, the project risk assessment system can pull in data attributes from multiple data sources in real-time to compute metrics for each of the condo projects monitored by the system. In some examples, each metric represents a certain aspect of risk associated with a condo project or a certain measure of viability of a condo project.

The implementations of the present disclosure provided herein are a significant improvement over manual, conventional methods of condo project risk assessment that are subject to human errors, time delays, and cost inefficiencies that affect both lenders and potential homeowners seeking to purchase property within a condo unit. The ability for US borrowers to close a condo loan can take one to three weeks longer (on average) than a single family home, which requires additional operational costs to lenders and often borrowers. The additional time needed to close a condo loan is due to lenders requiring that condo Home Owners Associations (HOAs) populate non-standard, lender-specific questionnaires. The information supplied in HOA questionnaires allows lenders to contractually represent and warrant to a GSE's existing seller/servicer (credit) guidelines.

Using conventional systems, it is common for condo HOAs to charge $200-$400 to fill out an HOA questionnaire, which lenders and/or borrowers are forced to absorb. Additionally, HOA questionnaires are often populated with errors requiring lenders to hire internal condo project eligibility experts to evaluate or correct the HOA questionnaires with HOA communities, outsource the function to 3rd party experts, or not offer lending services for condos (which is common for many smaller lending institutions).

By fully automating processes for assessing condo project risk and approving condo projects for purchase as discussed further herein, US borrowers/lenders can close a condo loan one to three weeks faster than conventional methods, avoid potential mortgage rate lock costs caused by needing to extend an agreed upon loan rate (for example 4.5% from three to five weeks), avoid the operational costs of paying HOAs hundreds of dollars to fill out HOA questionnaires, and avoid the need to hire project eligibility experts to review HOA forms. Additionally, an additional benefit of the implementations described further herein is that lenders may no longer have to represent and warrant (contractually guarantee) that a project meets all requirements listed in a GSE's seller servicer guidelines because of the accuracy and reliability of the condo project risk assessments performed by the system. This reduces the 'repurchase risk' for a given loan in terms of project eligibility, meaning a GSE may not ask for its funds back following the purchase of a potentially defective loan. The information for each condo project will be consistently extracted and the risk can be evaluated consistently and in real-time based on the computed metrics.

FIG. 1 is a diagram of an example environment 100 for a condo project risk assessment system 108. The diagram illustrates a series of interactions between one or more participants and devices in the condo project risk assessment system 108, which is configured to obtain data from multiple disparate data sources related to condo projects and real estate sales associated with condo projects or other real estate entities or properties, extracts project attributes from the received data, and organizes the project attributes into data levels based on whether the attributes are associated with a loan, appraisal, unit, building or project. In some examples, the risk assessment system 108 links data each of the data levels to related data in adjacent data levels, and the links allow the system 108 to make inferences about condo project attributes based on linked attributes in other data levels. In some implementations, the risk assessment system 108 calculates metrics for condo projects based on the attributes associated with each of the data levels. Based on the metric calculations, the system 108 can determine an amount of risk associated with purchasing or making loans for units in the condo project.

In some embodiments, the risk assessment system 108 can determine whether loans for units within a given condo project are approved for purchase by a government sponsored enterprise (GSE), referred to as operational relief, based on the risk assessment performed by the system 108. This automated approval process performed by the risk assessment system 108 can, in some examples, completely replace conventional condo project approval processes that rely upon manual completion and submission of condo project questionnaires by HOA personnel. In some implementations, the HOA personnel may have incomplete knowledge of how to properly complete the questionnaires, which can lead to delays in home loan origination cycles. Further, HOAs often charge fees for completing the condo project questionnaires. As discussed above, automation of the condo project approval process by the risk assessment system 108 eliminates the need for manual completion of condo project questionnaires (for approved projects). This saves both homeowners and lenders time and money because the system 108 is able to provide instantaneous feedback regarding where a condo project is approved for purchase by the GSE.

In some examples, the automated risk assessment performed by the system 108 can also be used to provide up-front representation and warranty relief approval for customers 102 (e.g., mortgage lenders). Representation and warranty relief, in some implementations, is assurance given by a GSE to a mortgage lender that the GSE will not make the lender repurchase the loan from the GSE at a future time. In some embodiments, the condo project approval processes performed by the risk assessment system 108 can replace all or a portion of a condo project approval process associated with making representation and warranty relief decisions, which provides an additional benefit to lenders of not having to hold as much capital.

Customers 102, in some implementations, include computing devices and databases distributed across a widely dispersed network that may be distributed across a large, international geographic area. The customer network, in some implementations, can be separate and independent from any network associated with any other participant or entity in the project risk assessment environment 100, such as external data sources 106 or back-end users 104. In some implementations, the customers 102 can include mortgage lenders who are seeking to have a government-sponsored enterprise (GSE) confirm that a condo project is approved for representation and warranty relief submit a request for condo project approval with the system 108 at a remote computing device 158, such as mobile device 158*a*, computer 158*b*, or any other type of remote computing device. In one example, customers 102 submit requests at one or more user interface screens provided by the project risk assessment system 108 through a web or application interface. In other examples, the customers 102 can also include condo management and/or homeowners' association (HOA) management personnel who are seeking information regarding whether their condo projects are approved for operational and/or representation and warranty relief and what aspects of the projects are causing the condo projects to fail the approval process. In other examples, the customers 102 may also include home buyers who are wanting to know whether there are risks associated with a condo project for a unit they are interested in purchasing.

In some implementations, the customers 102 may submit requests to the risk assessment system 108 by inputting identification information (e.g., address, condo project name) for a condo project at a user interface screen for the system 108. In other examples, the customers 102 can also submit home loan documentation and appraisal information directly to the system 108. The information and/or documentation provided in a request, in some examples, may be stored in data repository 110 as request data 111.

Back-end users 104, in some embodiments, include computing devices and databases distributed across a widely dispersed network that may be distributed across a large, international geographic area. In some implementations, the back-end users 104 can include GSE personnel and computing systems that can use the risk assessment system 108 to monitor the automated risk assessments performed by the risk assessment system 108. In some examples, the back-end users 104 can resolve and/or confirm any condo project name discrepancies that are identified by the system 108. In some embodiments, in response to the system 108 disapproving a condo project for operational relief and representation and warrant relief, the customer 102 may review attributes of the condo project and/or feedback from system 108 and choose to submit a unit level exception for the condo project. In some implementations, the back-end users 104 may include GSE computing systems and/or human resources (that manually research online sources) that provide utility fee information; HOA community information including but not limited to financial, insurance, legal structure and/or delinquent assessment information; and other information associated with condo projects. The back-end user network can be separate and independent from any network associated with any other participant in the project risk assessment environment 100, such as the external data sources 106 or customers 102.

External data sources 106, in some implementations, include computing devices and databases distributed across a widely dispersed network that may be distributed across a large, international geographic area. The external data source networks can be separate and independent from any network associated with any other participant in the project risk assessment environment 100, such as the customers 102 or back-end users 104. In addition, the data handled and stored by the external data sources 106 may be in a different format than the data handled and stored by the other participants in the project risk assessment environment 100. In some implementations, the external data sources 106 may include public and private data sources that provide condo project information. In some embodiments, the external data sources 106 can include servers and websites that provide real-estate information, such as multiple listing service (MLS) computing systems. In some examples, the external data sources 106 can also include public records computing systems that provide access to real estate sale information and litigation data related to any legal proceedings that affect a condo project. In one example, the external data sources 106 may also include business directory servers (e.g., Smithbook for Condo/hotels) and websites for individual condo projects. In other examples, the external data sources 106 can include servers and websites for catastrophic weather zone systems (e.g., flood, tornado, and tornado zones) that provide information regarding whether a given condo project is at risk for experiencing a natural disaster. The external data sources 106, in some examples, can also include database servers from other organizations and computing systems within a GSE that handle different home loan and appraisal data for purposes other than condo project risk assessment. In some implementations, the information from external data sources 106 is stored in data repository 110 as source data 128.

The customers 102, back-end users 104, external data sources 106, and data repository 110 can connect to the project risk assessment system 108 through computing devices 158 (e.g., mobile device 158*a*, computer 158*b*, or any other type of computing device) via a wired or wireless network (not shown). The network can include one or more networks, such as the Internet and can also communicate via wireless networks such as WI-FI, BLUETOOTH, cellular networks including EDGE, 3G, 4G, and 5G wireless cellular systems, or any other wireless form of communication that is known.

The project risk assessment system 108 includes one or more engines or modules that perform processes associated with extracting condo project attributes from received source data, organizing the project attributes into data levels, linking data in each of the data levels to related data in adjacent data levels, calculating metrics for condo projects based on the attributes associated with each of the data levels, and determining an amount of risk associated with purchasing or making loans for units in the condo project. References to the engines or modules throughout the disclosure are meant to refer to software processes executed by circuitry of one or more processing circuits, which can also be referred to interchangeably as processing circuitry. In some implementations, the processes associated with the project risk assessment system 108 can be performed by one or more servers having one or more processing circuits such that some processes or portions of processes may be performed on different servers.

The project risk assessment system 108, in some implementations, includes a data mining and collection engine 130 that controls the gathering of data from the customers 102, back-end users 104, and external data sources 106 in real-time. In some implementations, the data mining and collection engine 130 receives condo project approval requests submitted to the project risk assessment system 108 by the customers 102 and automatically passes the submitted requests to the data management engine 132. In addition, the data mining and collection engine 130 can receive other manually entered information from the participants in the project risk assessment environment 100, such as unit-level exceptions and condo project name resolutions provided by back-end users 104.

In some examples, the data mining and collection engine 130 can access the data from external data sources 106 by periodically performing web scraping or crawling procedures at external data source websites. In one example, a data mining and collection engine 130 can perform scrapes of external data source websites at predetermined intervals (e.g., weekly, monthly, quarterly, yearly) to update source data 128 stored in data repository 110. In another example, the data mining and collection engine 130 can periodically monitor the external data source servers and websites for updates and perform scrapes when any data updates are detected. For example, the data mining and collection engine 130 can monitor MLS servers for postings of new listings or updates of current listings that indicate home sale price, HOA costs, condo project condition, and pending litigation associated with the condo project. In some implementations, the project risk assessment system 108 can access data from external data sources 106 through a subscription service in which the external data sources 106 provide source data 128 to the project risk assessment system 108 through an electronic data interchange (EDI). For example, the data mining and collection engine 130 can receive litigation data related to condo projects via a subscription service with a litigation data provider.

In some examples, the data mining/collection engine 130 obtains a list of project names and addresses from name resolution engine 144. The name resolution engine 144 runs a series of rules and scrubbing techniques from other data sources such as appraisal data 114 stored in the data repository 110. Through application of the data scrubbing techniques, the name resolution engine 144 generates a national list of condo projects and corresponding addresses stored in data repository 110 as unit data 116, building data 118, and project data 120.

In one example, the project risk assessment system 108 also includes a data management engine 132 that organizes the data received by the project risk assessment system 108 from the customers 102, back-end users 104, and external data sources 106 and controls data handling during execution of the processes described further herein. In some implementations, the data management engine 132 processes data gathered by data mining and collection engine 130 from the external data sources 106 and loads the gathered data to data repository 110 as source data 128. In some implementations, the data management engine 132 processes, normalizes, and categorizes the source data 128 for condo projects into one or more data levels that include loan data 112, appraisal data 114, unit data 116, building data 118, and project data 120 for all of the condo projects in a given geographic region (e.g., city, metropolitan statistical area (MSA), county, country). In one example, the data management engine 132 can extract a name and address of a respective condo project from the appraisal documentation, which can be stored as attributes for building data 118 and/or project data 120. In another example, appraisal documentation or MLS data may indicate that the common elements for the condo project are leased from a third party, which the data management engine 132 can store as project data 120. In some implementations, with each item of loan data 112, appraisal data 114, unit data 116, building data 118, and project data 120, the data management engine 132 applies a date tag indicating a date that the item of data was obtained from an external data source 106 and/or a date from the associated appraisal or loan documentation.

In some implementations, the data management engine 132 can also normalize HOA cost information provided in appraisal documentation and/or MLS listings by detecting within the documentation or listings that an HOA fee includes utilities (e.g., electricity, gas, heat, sewage, and/or waste collection) and subtracting out utility costs from the HOA fee. In some examples, upon detecting that one or more utilities are included in an HOA fee, the data management engine 132 may trigger, via event trigger engine 134, the data mining and collection engine 130 to obtain average utility cost information from public records computing systems and/or websites and servers for local utility companies.

The data management engine 132, in some embodiments, also controls the interaction of the project risk assessment system 108 with at least one data repository 110 associated with the risk assessment environment 100. For example, the data management engine 132 controls the storing and access of both system-generated data and system-received data as well as the interactions between system-generated and system-received data. In some examples, the data management engine 132 receives source data 128 from at least one external data source 106, normalizes the received source data 128 into a predetermined format that is compatible with the system 108, and stores the source data 128 in data repository 110. Additionally, the data management engine 132 receives updated thresholds for one or more metrics from threshold adjustment engine 140 and stores the updated threshold information in data repository 110 with an associated metric as metric data 124. In some examples, the data management engine 132 receives price growth data from an internal data engine housed outside of the project risk assessment system 108, referred to as Weighted Repeat Sales Index (WRSI) engine 148. Data from the WRSI engine 148 is processed by the data management engine 132 and stored in data repository 110 as source data 128. The metric processing engine 138 and threshold adjustment engine 140, in some implementations, can work in unison to determine if a given condo project's price growth is below a locally cited index for at least three units.

The data management engine 132, in some embodiments, also receives unit valuation data from a home valuation explorer (HVE) engine 150 housed outside of the project risk assessment Engine 108. Data from the HVE engine 150 is processed by the data management engine 132 and stored in data repository 110 as source data 128. The metric processing engine 138 and threshold adjustment engine 140, in some examples, work in unison to determine if a given condo project's total unit valuations are over or undervalued by programmed statistical limits. Additionally, the data management engine 132 can receive condo project approval information from risk assessment engine 142, which is stored in data repository 110 as approval data 126. The data management engine 132 can also access any of the data from the data repository 110 for use by the project risk assessment system 108, such as linkage data 122 and metric data 124, which metric processing engine 138 uses to perform metric calculations for each assessed condo project. Additionally, the data management engine 132 controls the flow of data between the data repository 110 and the system 108.

The project risk assessment system 108, in some embodiments, also includes an event trigger engine 134 that manages the flow of data updates to the project risk assessment system 108. In some implementations, the event trigger engine 134 detects updates to source data 128, request data 111, or any other type of data collected or controlled by the project risk assessment system 108. For example, the event trigger engine 134 detects modifications or additions to loan data 112, appraisal data 114, unit data 116, building data 118, and/or project data 120 and, in response, triggers metric processing engine 138 to recalculate metrics affected by the data updates. In addition, the event trigger engine 134 operates automatically to trigger the data management engine 132 when updated data is detected by the data/mining and collection engine 130.

The project risk assessment system 108, in some embodiments, also includes a data linkage engine 136 that establishes connections between condo project data levels, which is stored in data repository 110 as linkage data 122. In some implementations, the linkage data 122 establishes relationships between loan data 112, appraisal data 114, unit data 116, building data 118, and project data 120 that allow connections and inferences to made forward and backward between data levels. In addition, the linkage data 122 allows metrics to be calculated more efficiently at specific data levels. Further, the linkage data 122 expands the scope of data that is instantaneously available for a respective condo project without having to parse through ad hoc data files of appraisal and loan documentation.

For example, loan data 112 can include a loan-to-value (LTV) ratio calculation for a loan, which can be used by metric processing engine 138 to calculate an LTV metric. Appraisal data 114, in some examples, can include information that is specifically provided by appraisers on appraisal documentation, such as whether the condo project has common leased elements (e.g., parking lots, swimming pools, tennis courts). In one example, unit data 116 can include information related to a specific unit within a condo project, such as a selling price of a unit, whether the unit is occupied by the owner of the unit or by a renter (e.g., investor owned), and number of days on the market for a respective unit. In some embodiments, building data 118 can include information specific to a condo building within a condo project, such as construction quality data and exterior building condition. Project data 120, in some examples, can include a condo project name, a total number of units in the condo project, and litigation history for the condo project.

In some examples, the data linkage engine 136 links loan data 112 to appraisal data 114 by a unique key. In some examples, the unique key may be a loan identification number. In addition, the data linkage engine 136 links appraisal data 114 to unit data 116 by a full address for the unit (e.g., street, unit number, city, and state) and links a unit data 116 to respective building data 118 by just a street portion of the address. In some examples, the condo address information stored as unit data 116, building data 118, and project data 120 are connected within data repository 110 so that the risk assessment engine 142 (and other engines of the system 108) can correctly and efficiently identity the intended condo project for assessment. The data linkage engine 136, in some examples, links building data 118 to respective condo project data 120 by a condo project name. In some embodiments, linking related condo project attributes between data levels allows the risk assessment system 108 to make inferences where there would otherwise be missing or inconsistent data. For example, the system 108 may have access to more appraisal data 114 than loan data 112 so not every set of appraisal data 114 stored in data repository 110 is associated with a set of stored loan data 112 or loan documentation accessible by the project risk assessment system 108. Even though one or more sets of appraisal data 114 are not tied to a loan, the information about a condo unit and its respective building and project in the set of appraisal data 114 can be linked to its related data levels, which provides the system 108 with instantaneous access to a greater scope of information that can be pulled in to assess the risk associated with purchasing loans for condo units from a particular condo project.

Figure 3:
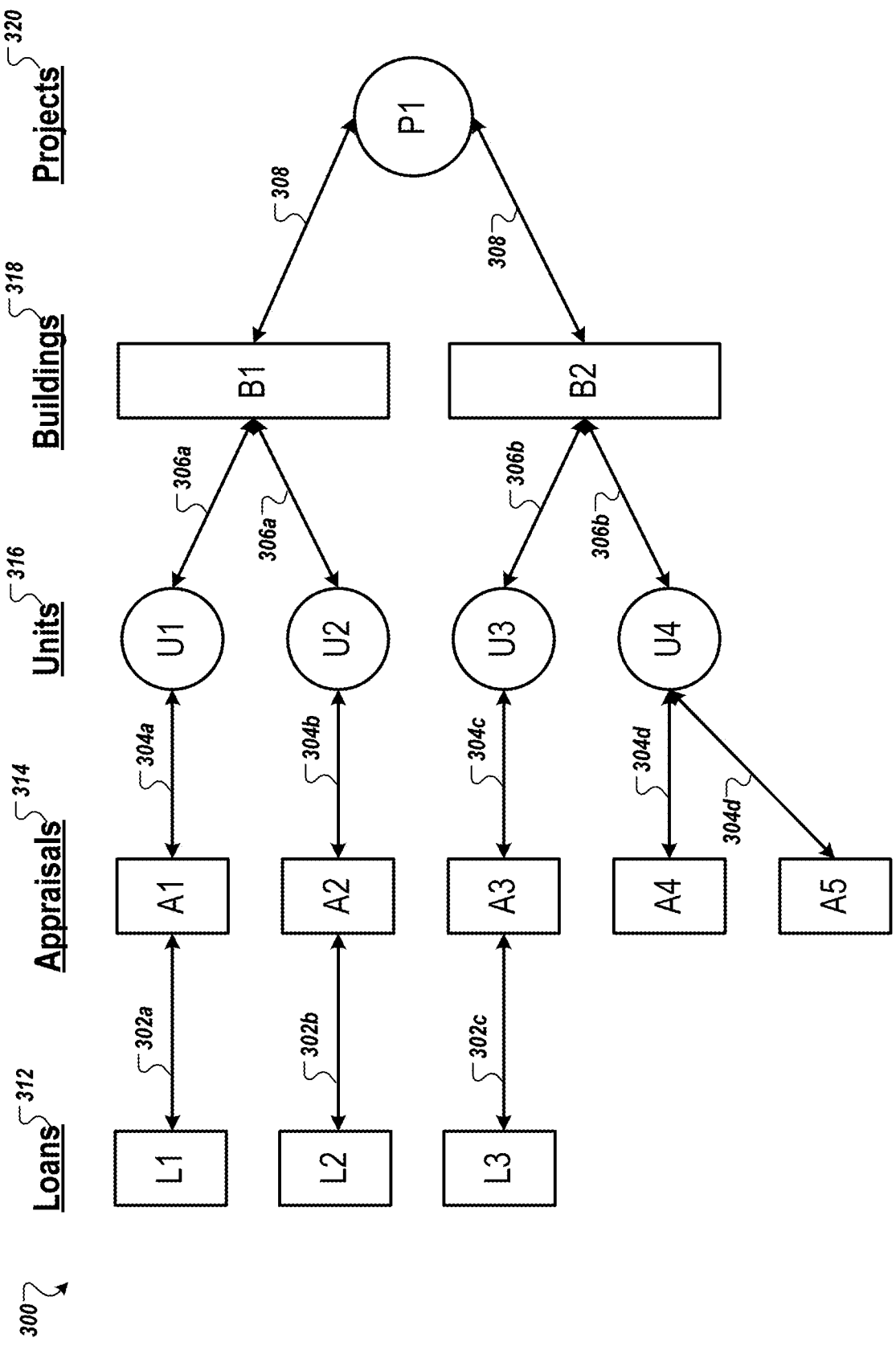
FIG. 3 is a diagram illustrating links between data levels in a project risk assessment system.

For example, FIG. 3 illustrates a diagram of links between data levels of condo project information established by data linkage engine 136 for a condo project. In one example, a data repository (e.g., data repository 110 in FIG. 1) can store loan data 312 for loans L1, L2, L3; appraisal data 314 for appraisals A1, A2, A3, A4, A5; unit data 316 for units U1, U2, U3, U4; building data 318 for buildings B1, B2; and project data 320 for condo project P1. In some implementations, data linkage engine 136 can link loan data 312 for each loan to appraisal data 314 for a corresponding appraisal (for example, L1 to A1, L2 to A2, L3 to A3) with a unique key 302, such as a loan identification number. For example, loan L1 can be linked to appraisal A1 with key 302a.

In addition, appraisal data 314 can be linked to corresponding unit data 316 (for example, A1 to U1, A2 to U2, A3 to U3, and A4 and A5 to U4) with full address information 304, which can include street address, unit number, city, and state for the respective condo unit. In some examples, because not every appraisal results in completion of a loan for a GSE, more than one appraisal may be linked to the same unit. In some examples, GSEs can have access to appraisal data for other GSE institutions. For example, appraisals A4 and A5 can both be linked to unit U4 by full address data 304d. Because the data linkage engine 136 can link information from multiple appraisals to a respective unit, the accuracy of metrics computed by the metric processing engine 138 can be improved, which also improves the risk assessments performed by risk assessment engine 142.

In some embodiments, data linkage engine 136 can link unit data 316 for each unit in a condo project to building data 318 for a corresponding building within the condo project (for example, U1 and U2 to B1, U3 and U4 to B2) with a portion of an address 306, such as a street portion of an address without unit, city, and state information (e.g., 123 Elm Street). For example, units U1 and U2 can be linked to building B1 with a first street address 306a, and units U3 and U4 can be linked to building B2 with a second street address 306b. The data linkage engine 136 can also link building data 318 for each building to a respective condo project 320 (for example, B1 and B2 to P1) with a condo project name 308. In some implementations, the linkage data 302, 304, 306, and 308 (e.g., linkage data 122 in FIG. 1) establishes relationships between loan data 312, appraisal data 314, unit data 316, building data 318, and project data 320 that allow connections and inferences to made forward and backward between data levels. In addition, the linkage data 302, 304, 306, and 308 allows metrics to be calculated more efficiently at specific data levels.

Returning to FIG. 1, the project risk assessment system 108, in some implementations, also includes a metric processing engine 138 that calculates metrics for each condo project assessed by the project risk assessment system 108. In some implementations, data repository 110 stores metric data 124 that includes multiple risk assessment metric criteria and thresholds that are associated with each of the metrics. In some examples, the metric data 124 can also include the resulting metric calculations for each condo project evaluated by the system 108. In some implementations, each metric can be calculated based on data associated with a particular data level (e.g., loan data 112, appraisal data 114, unit data 116, building data 118, project data 120), which further improves the efficiency of metric calculations. Because the information used to calculate each of the metrics is immediately accessible within a particular data level, the metric processing engine 138 does not have to scan vast amounts of data from disparate data sources to detect the appropriate items of data for calculating each of the metrics. As discussed further below, there can be specific statistical and/or credit thresholds associated with each of the metrics (see FIGS. 4A-4D) and being able to specifically target the proper information associated with each metric provides for efficient metric computation.

Further, the data at one data level may provide better visibility of information than the data available at another data level. For example, project data 120 may include information about any pending litigation that may affect a given condo project, so a metric associated with whether the condo project has any pending litigation is a metric that is calculated at the project level. In another example, because unit data 116 can include a number of days units in a condo project have spent on the market, a marketability metric can be a unit-level metric.

For example, FIGS. 4A-4D show a table 400 of a set of example metrics 402-460 for assessing condo project risk. In some examples, the metrics 402-460 can target different aspects of loans, appraisals, units, buildings, and condo projects based on information found in property appraisals, loan documentation, real estate sale information, and other information provided from external data sources 106. In some examples, for a given condo project, the metric processing engine 138 may compute all or a portion of the metrics 402-460 shown in FIGS. 4A-4D. In some embodiments, the metric processing engine 138 can compute each of the metrics 402-460 for multiple geographic region sizes (e.g., zip code, neighborhood, city, county, MSA, state).

In some examples, a portion of the metrics are based on metrics 402-460 may be based on seller servicer guide requirements that are enforced by GSEs. For example, condo projects that are categorized as time shares (metric 424), cooperatives (metric 442), multi-dwelling projects (metric 444), continuing care retirement communities (CCRC) (metric 446), CONDOTELs (metric 448) can fail their respective metrics that are associated with seller servicer guide requirements.

In some implementations, a portion of the metrics 402-460 can provide an indication of risk associated with loan characteristics for units within a condo project. For example, for delinquency metric 440 that assesses condo project risk based on the number of units with delinquent loans, the metric processing engine 138 may fail a condo project that has more than two loans that have been greater than or equal to 90 days delinquent within the past year. In addition, for loan-to-value (LTV) metric 456, the metric processing engine 138 may fail a condo project where more than half of the condo project's loans have an LTV>90. In another example, for weighted repeat sales index (WRSI) metric 458, the metric processing engine 138 can fail a condo project if loans for units within the condo project fall significantly below the local index for at least three units in the condo project. Because loans are linked through an entire condo project by the data linkages established by the data linkage engine 136 (see FIG. 3), the loan-based metrics can be used to assess risk and viability of their associated condo projects.

In some embodiments, each of the metrics 402-460 can provide an indication of viability of a condo project and/or risk associated with purchasing loans for units in a given condo project. For example, marketability metric 432 (Days on Market vs. MSA) fails a condo project if greater than or equal to three units have been sitting on the market for more than a predetermined percentile of the Days on Market observations for a particular MSA. Multiple units in a condo project that have been sitting on the market for longer than the predetermined percentile may be an indication that the condo project has been negatively affected by a factor such as a down market, litigation, or poor HOA management. In some implementations, because market conditions can fluctuate over short periods of time, the metric processing engine 138 may use home sale data that falls within a predetermined recent date range (e.g., within a year, within 6 months, within 3 months) for the marketability metric 432.

In some implementations, a portion of the metrics 402-460 may assess viability of a condo project as indicated by how well the condo project property is being maintained, which can affect marketability and viability of the condo project. For example, for physical deficiency metric 426, metric processing engine 138 evaluates a percentage of units within a condo project where appraisers noted physical deficiencies within a unit. For construction quality metric 430, metric processing engine 138 evaluates a percentage of units within a condo project where appraisers noted poor construction quality of the condo project and/or unit.

In another example, HOA cost to home price ratio metric 434 may provide an indication of lack of condo project viability if the HOA cost over the course of a standard mortgage length (e.g., 30 years) to home price ratio is greater than a threshold for the respective MSA. Additionally, the metric processing engine 138 is configured to normalize the HOA cost by automatically subtracting out any portion of an HOA fee that is attributed to utilities that are paid through the HOA. This normalization is performed to make the ratios comparable given that some HOAs include significantly more utilities as part of their HOA fee, thereby increasing the HOA fee. Net of the utility fees, significantly larger HOA fees may indicate that the condo project has not been properly financially maintained. In some implementations, the metric processing engine 138 can determine from information provided in appraisals that a given HOA fee includes one or more utility payments and can obtain average utility costs for units in the condo project from one or more external data sources 106, such as utility records websites.

Figure 5:
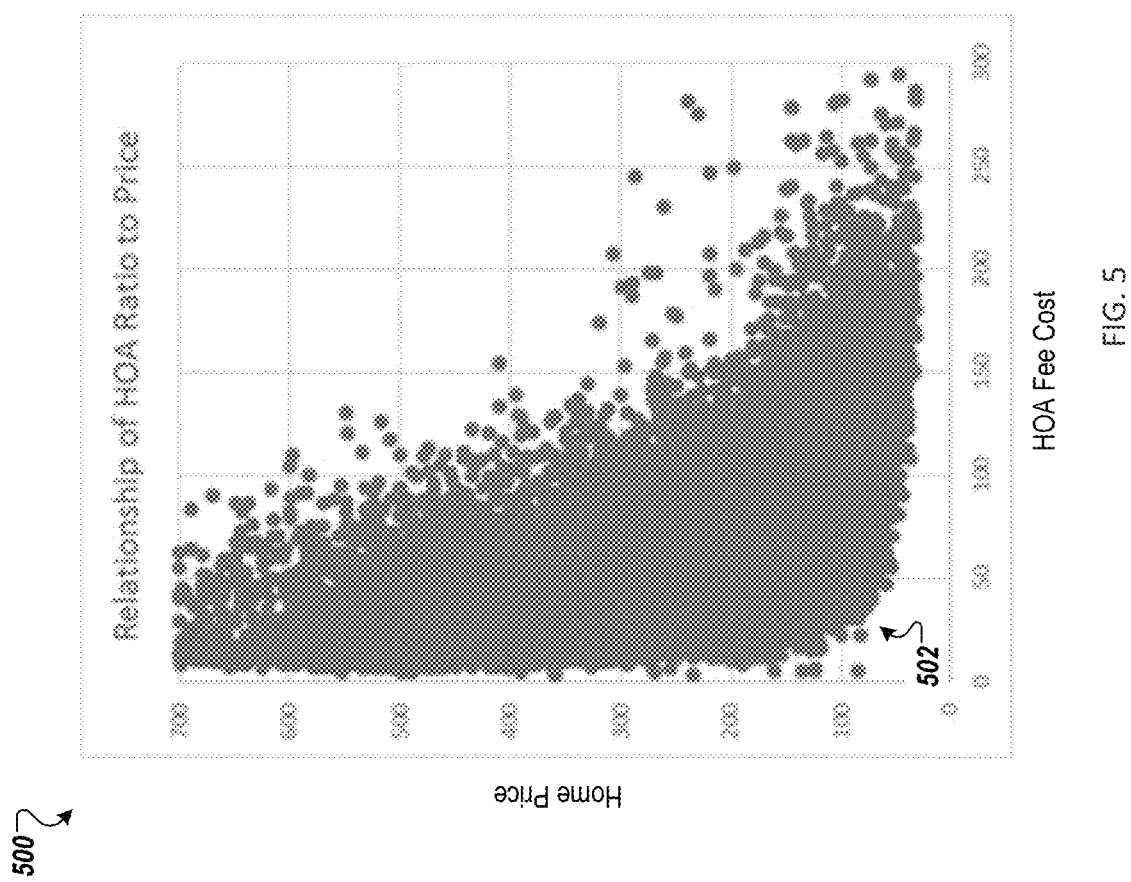
FIG. 5 is a graph illustrating a relationship between homeowner association (HOA) fee cost versus home price.

FIG. 5 shows a graph 500 illustrating a general inverse relationship of HOA cost to home price ratio metric 434. In some implementations, the ratio of HOA cost to home price can be a large indicator of risk associated with a condo project because high HOA fees can be financial mismanagement of the HOA and indicative of the liquidity and/or underlying values of the units within the project. As an example, if condo fees are too high relative to neighboring/equivalent condo projects, units may be forced to sell at lower prices, thus creating potential default risk for current residents who find their equity positions less than they had hoped for and/or the balance on their home loan worth exceeding the value they can sell the unit for. As an inverse example, if condo HOA fees are too low, units may be falsely priced too high, creating a potential future scenario where HOAs may be forced to burden residents with special assessments or large increases in HOA fees to cover maintenance items. These types of events can put sudden adverse pressure on unit prices, setting up a future default risk scenario. In addition, when an investor purchases a condo unit to rent as opposed to the unit being "owner occupied," the investor may have a higher likelihood of exiting the market once the sum of HOA fee, property tax, and marginal improvement expenses becomes too high to earn expected profits. Exit of investors from the market can cause a significant drop in demand for units within the condo project and, as a result, causes prices to drop. As HOA fees rise above a certain threshold, the amount a home buyer is willing to pay for a unit within the condo project falls. As shown in FIG. 5, there is a location-specific inflection point 502 that occurs in the ratio of HOA cost over the mortgage lifetime to home price where every percentile of the price starts to drop exponentially (or at least linearly) with an extra unit of increase in the HOA cost. That means that buyers demand higher compensation in terms of decreased property price to accept long-term liability of paying higher HOA fees. The threshold adjustment engine 140 may set the threshold for the HOA cost to home price ratio metric 434. On average, for most states, MSA-specific thresholds calculated as a certain percentile on the distribution of ratios are at levels about 100%.

Returning to FIG. 1, in some implementations, the metric processing engine 138 performs calculations for all the metrics on a periodic basis, such as monthly, quarterly, semi-annually, or annually. In other examples, the metric processing engine 138 calculates metrics individually in response to receiving data updates from one or more external data sources 106 that affect one or more respective metrics. For example, the metric processing engine 138 may recalculate a particular metric in response to receiving a notification from event trigger engine 134 that items of data in one or more data levels for a condo project have been updated. For example, upon receiving a loan document submission from a customer 102 that includes updated pricing information and HOA cost information for a condo unit, the metric processing engine 138 may recalculate the HOA cost to home price ratio metric 434 for the respective condo project. In still other examples, the metric processing engine 138 performs metric calculations in response to receiving a condo project approval request from a customer 102. In some embodiments, the metric processing engine 138 can compute metrics at different periodicities based on a dynamicity of the data used to compute each of the metrics. For example, because some unit-level attributes (e.g., home sale prices, days on market, litigation) may change at a faster rate than some project-level and building-level attributes that are mostly static (e.g., whether the condo project is a manufactured home, whether the condo project has excessive commercial space, whether a condo building has inferior construction quality, etc.).

In some implementations, the metric processing engine 138 can determine which and/or how many items of data to use for computing each metric. For example, the metric processing engine 138 can use data from one or more appraisals to compute a result for a metric that evaluates whether a condo project has leased common elements. If a condo project has any leased common elements besides a parking lot, then in some embodiments, the condo project fails the leased common elements metric (see metric 406 in FIG. 4A). In one example, the metric processing engine 138 may determine that a condo project fails the leased common elements metric 406 if two appraisals within a predetermined time period (e.g., within 1 month, 3 months, 6 months, 1 year) indicate that the condo project has leased common elements. In other examples, the condo project may fail the leased common elements metric 406 if a single appraisal indicates that the condo project has leased common elements. In addition, because each piece of appraisal data 114 includes a date tag, the metric processing engine 138 can efficiently identify whether a particular piece of data is within the predetermined time period for the respective metric.

In some implementations, the project risk assessment system 108 includes a threshold adjustment engine 140 that adjusts the thresholds associated with each of the metrics based on additional information obtained by the system 108. In some examples, each of the metric thresholds is based on data distributions for the metrics in which a metric threshold is set to filter out condo projects that are outliers in the distribution. For example, a condo project that fails to meet a metric threshold may fall more than a predetermined number of standard deviations from a mean value for the metric. In some embodiments, the threshold adjustment engine 140 calculates multiple thresholds for an individual metric used by the metric processing engine 138. For example, the metric data 124 may include thresholds associated with each geographic area from small to large (e.g., city, MSA, county, multi-state region, country) since the metrics used to assess the risk associated with condo projects varies from area to area. For example, a city with a very active real estate market may have a very low average number of days on the market while a rural area with fewer real estate transactions may have a very high average number of days on the market.

In some implementations, as additional source data 128 is received by the system 108, threshold adjustment engine 140 modifies each affected threshold accordingly so that the system 108 can assess the risk associated with purchasing condo project loans based on the most up-to-date information. Further, maintaining customized thresholds for different-sized regions allows the metric processing engine 138 to apply a threshold for a larger geographic region when there is insufficient information for a smaller-sized area. For example, if the system 108 does not have enough information to determine a threshold for a metric at an MSA level, the metric processing engine 138 uses the threshold for the respective state threshold for the metric. In some examples, the metric processing engine 138 uses a threshold for smallest geographic region size that has greater than a predetermined accuracy confidence level. In some implementations, as the project risk assessment system 108 receives additional source data 128 from external data sources 106 that allow the threshold adjustment engine 140 to calculate a threshold for a particular geographic region that improves a level of confidence in its accuracy (e.g., the number of data points used to compute the threshold is above a predetermined threshold), then the threshold adjustment engine 140, via the event trigger engine 134, can trigger the metric processing engine 138 to recalculate the metric associated with the respective threshold.

The threshold adjustment engine 140, in some embodiments, periodically adjusts thresholds for the metrics, such as monthly, quarterly, semi-annually, or annually. In other examples, the threshold adjustment engine 140 adjusts thresholds individually in response to receiving data updates from one or more external data sources 106 that affect one or more respective thresholds. In other examples, the threshold adjustment engine 140 can calculate threshold adjustments at different periodicities based on the dynamicity of the data affecting the thresholds.

As shown in FIGS. 4A-4D, in some implementations, each of the metrics 402-460 applied by metric processing engine 138 can have one or more thresholds that are adjustable by threshold adjustment engine 140 based in part on changing market conditions and/or changes in corporate credit policies. In some examples, causes of such changes may be based on location and/or changing demographics of an area. For example, for metric 414 that fails a condo project having more than 35% commercial space in a condo project building (e.g., a grocery store or other retail store located within the same building as a condo project), the threshold adjustment engine 140 can raise or lower the threshold for commercial space based upon statistical analyses of condo projects with commercial space at a given location. In other examples, the threshold adjustment engine 140 can raise or lower the number of appraisals required to trigger a metric failure. For example, metric 418 (tenant occupation) and 420 (manufactured homes) may require that two independent appraisals indicate a respective failing condition. However, based on the availability of source/appraisal data, the threshold adjustment engine 140 can increase or decrease the number of appraisals required to indicate the failing condition. In another example, for owner concentration metric 412, the threshold adjustment engine 140 can increase or decrease the threshold for a single owner owning a percentage of units within a condo project above or below 10%. In another embodiment, the threshold adjustment engine 140 can adjust metric thresholds based on manual threshold adjustment inputs received from back-end users 104 (e.g., human modelers).

Returning to FIG. 1, the project risk assessment system 108, in some embodiments, also includes a risk assessment engine 142 that performs a risk assessment of a condo project based on the calculated metrics for the respective project. In some implementations, the risk assessment engine 142 assesses the risk of condo projects on a pass/fail basis throughout the rules waterfall that runs through the metrics listed in FIGS. 4A-4D. In one example, a project that passes an overall risk assessment, or that would be approved, passes on all metrics listed in FIGS. 4A-4D. For example, the risk assessment engine 142 can assign a respective condo project a passing score (e.g., representing a relatively low amount of assessed risk) if all of the calculated metrics for the project are within an acceptable threshold range. If any of the calculated metrics is outside of a respective threshold range, then in some examples, the risk assessment engine 142 assigns a failing risk assessment score to the condo project to indicate a high amount of assessed risk for the condo project. In other embodiments, the risk assessment engine 142 may assign a failing score to a condo project if a predetermined number of metrics do not meet the corresponding threshold. In some aspects, the risk assessment engine 142 can compute a risk assessment score for each respective condo project that is a percentage or on a numeric scale (e.g., 1 to 10) based on the calculated metrics. In some implementations, one or more metrics (e.g., crowdsourcing 459 and manual approval 460 metrics) can be "super path" metrics that can be weighted or leveraged to strongly influence a risk assessment for a condo project. In some aspects, these super path metrics may give many lenders represented and warranted that a given project was eligible to GSE guidelines via multiple delivered loans. Also, these super path metrics may allow back-end users 104 (e.g., GSE employees) to more easily conduct manual reviews of condo project eligibility on a one-off basis.

In some implementations, the risk assessment engine 142 computes a risk assessment for all of the condo projects monitored by the project risk assessment system 108 on a periodic basis (e.g., monthly, quarterly, semi-annually, annually). In other examples, the risk assessment engine 142 can compute risk assessments for condo projects when updated source data 128 is received from external data sources 106 and/or updated metric calculations for a respective condo project are performed by metric processing engine 138. In still other embodiments, the risk assessment engine 142 can compute a risk assessment for a condo project in response to submission of a query to the project risk assessment system 108 by a customer 102 via front-end driver engine 146.

In some embodiments, the project risk assessment system 108 also leverages a name resolution engine 144 that uses data science analytic techniques to resolve discrepancies between condo project names obtained from different types of source data 128. In some implementations, in addition to various attributes associated with a condo project, project data 120 can include name data that is used to differentiate condo projects from one another. In some examples, because condo project names are extracted from appraisal documentation, websites, and other different types of data sources, the names applied to the condo projects may not be consistent due to human error, having multiple HOAs associated with a particular condo project, and due to some condo projects being spread out over a broad area with different street names and/or addresses within a single project. In some cases, for garden style communities (i.e. low-rise condo project buildings), each unit may have a distinct address and corresponding street number, which is different from a distinct unit number. These types of nuances associated with identifying condo projects, buildings, and units are a major data analytics challenge when scaled on a national level to approximately 170,000 condo projects. In some implementations, the name resolution engine 144 can accurately identify, link, and associate the correct condo project names with the correct addresses. In some examples, the list of "scrubbed" condominium project names and corresponding addresses and resulting internal project identifier number from the name resolution engine 144 is a primary data collection item leveraged by the project risk assessment system 108.

In some embodiments, the project risk assessment system 108 applies machine learning algorithms to adjust threshold metrics and/or metric weightings and isolate and/or proactively identify and forecast higher risk condo projects and their corresponding geographic areas. In some implementations, the system 108 may present a recommended risk rating to back-end users 104 for final confirmation. For example, the project risk assessment system 108 may self-identify recommended changes to the metrics such as expanding a statistical confidence interval to capture greater or fewer projects that may be overvalued based on current market conditions and/or lowering a special assessment dollar trigger of $20,000 or 10% ratio based on upticks in delinquent loans in a given geographic MSA. The back-end users 104, in some implementations, can be prompted on a user interface screen for final approval and/or resolution.

In some implementations, the project risk assessment system 108 can also include a front-end driver engine 146 that controls dissemination of data and interactions with customers 102 and back-end users 104 through one or more UI screens and/or messaging formats (e.g., email, text message, or notification at an application interface). In some embodiments, user access to the system 108 is provided through a website or web-hosted application. In some examples, the front-end driver engine 146 can output information to the external devices 158 in response to queries received from customers 102 to determine an amount of risk associated with a respective condo project and based on the assessed risk of the condo project, determine whether a loan for a unit in the condo project may be purchased by a GSE associated with the system 108.

In some implementations, data repository 110 can include source data 128 obtained from external data sources 106 as described above. For example, the source data 128 can include data obtained from MLS servers and websites, litigation directory servers and websites, business directory servers and websites, public records servers and websites, and servers and websites for individual condo projects. In some examples, the source data 128 can also include loan documentation obtained from customers 102 and back-end users 104 and appraisal documentation obtained from appraisal data computing systems and websites and back-end users 104. In one example, appraisal documentation can also be obtained directly from customers 102 or from external data sources 106.

In some implementations, data management engine 132 processes, normalizes, and categorizes the source data 128 for condo projects into one or more data levels that include loan data 112, appraisal data 114, unit data 116, building data 118, and project data 120 for all of the condo projects in a given geographic region (e.g., city, metropolitan statistical area (MSA), county, country). In some examples, the data associated with one data level can be used to inform risk assessments made at another data level. For example, appraisal documentation obtained from one or more external data sources 106 can include information about a respective condo unit, building, and/or project that can be used to assess the risk of purchasing loans associated with the respective condo project. For example, the data management engine 132 can extract a name and address of a respective condo project from appraisal documentation, which can be stored as attributes for building data 118 and/or project data 120. In another example, the data management engine 132 can also extract information from appraisal documentation indicating that the common elements for the condo project are leased from a third party, which can be stored in data repository 110 as appraisal data 114. Additionally, the data management engine 132 can extract information from MLS source data indicating whether the condo project includes a manufactured building or there is pending litigation.

In some implementations, with each item of loan data 112, appraisal data 114, unit data 116, building data 118, and project data 120, the data management engine 132 applies a date tag indicating a date that the item of data was obtained from an external data source 106 and/or a date from the associated appraisal or loan documentation. The data tag can be used by metric processing engine 138 to identify which data to use when computing each metric for a condo project. For example, if the source data 128 includes home sale data such as days on the market for one unit in a condo project from 5 years ago and another unit in the same condo project from 1 year ago, metric processing engine 138 can use the data tag with the home sale data to identify the more recent home sale data, which may provide a more accurate representation of current market conditions.

In some embodiments, data repository 110 also stores linkage data 122 that links each data level within a condo project. In some implementations, metric data 124 includes one or more metrics that the system 108 uses to assess the risks of purchasing loans associated with condo projects. In some examples, the metric data 124 can include a tier associated with a respective metric (e.g., loan, appraisal, unit, building, project). Each metric stored as metric data 124, in some implementations, can include one or more thresholds associated with the respective metric, which are used to determine whether a particular condo project and/or associated building, unit, appraisal, or loan passes or fails the respective metric. For a homeowner's association (HOA) cost to home price ratio metric, in some examples, if a ratio of HOA cost over an average life of a loan (e.g., 30 years) to home price for a unit in a condo project exceeds a predetermined threshold, such as 35%, then metric processing engine 138 may determine that the condo project fails the metric. The predetermined threshold may be MSA specific and could be 100% in some locations.

In some implementations, the project risk assessment system 108 also stores condo project approval data 126 that includes whether each of the condo projects evaluated by the system 108 passes or fails a condo project risk assessment based on the metric calculations performed by metric processing engine 138. In some embodiments, the metric processing engine 138 calculates metrics and the risk assessment engine 142 generates approval data 126 for all the condo projects assessed by the system 108 at periodic intervals, such as monthly, quarterly, semi-annually, or annually. In other examples, the risk assessment engine 142 generates approval data 126 for affected condo projects in response to receiving updated source data 128 from external data sources 106. In view of all the updated metric calculations, in some implementations, risk assessment engine 142 performs an updated risk assessment of the condo project and updates the corresponding approval data 126 in data repository 110.

Figure 2:
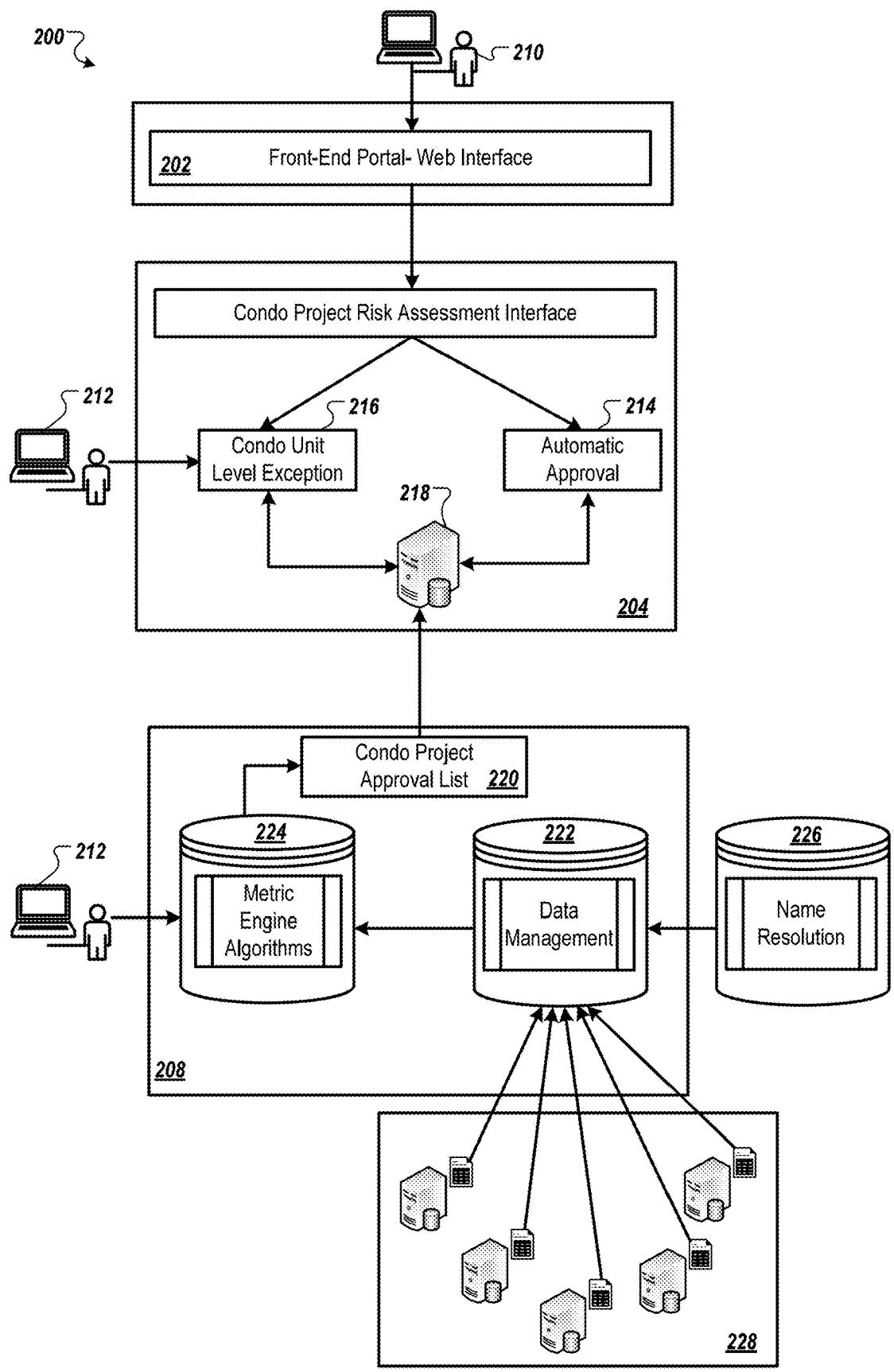
FIG. 2 is a diagram of an example work flow for a project risk assessment system.

Turning to FIG. 2, a diagram of a work flow for a project risk assessment system 200 is illustrated. In some examples, the project risk assessment system 200 can be the system 108 in FIG. 1. In some implementations, the work flow 200 shows interactions between participants and computing devices that make up the system 200. In one example, the project risk assessment system 200 is configured into computing layers 202, 204, 208 of computing devices and systems that provide real-time responses to system requests received from customers without having to overload system servers with multiple queries for data used to perform condo project risk assessments. In some implementations, each of the computing layers 202, 204, 208 can include a combination of physical and/or cloud-based servers and data storage devices that execute the tasks associated with each layer.

Further, because the system 200 organizes data associated with a condo project into data levels that are linked to each adjacent data level with unique linkage characteristics, data updates (e.g., newly received appraisal, loan, or MLS data) can be processed more efficiently. For example, when new appraisal documentation is received from customers and/or external data sources, the system 200 can propagate the data updates to each applicable data level and identify the metrics associated with any changes reflected in the data updates. In some implementations, the system 200 only re-computes metrics that are affected by changes in condo project data values.

In some embodiments, the project risk assessment system 200 can include a loan advisor suite (LAS) portal 202 that provides an interface between customers 210 (e.g., loan sellers and/or banks) and the system 200. The LAS portal 202, in some examples, is a web-based portal that customers 210 can access at a web interface. In some implementations, LAS portal 202 provides access to a number of computerized tools that can assist customers 210 with property valuation, loan underwriting, loan selling, loan quality assessment, and condo project risk assessment.

Upon selection at the loan advisor portal 202, customers 210 can gain access to a web interface for the condo project risk assessment tool 204. In some implementations, the condo project risk assessment tool 204 includes computing devices and systems that provide the web interface that allows customers 210 to submit condo project risk assessment requests to the system 200. In some examples, customers 210 submitting the requests provide an address or name for a condo project at the web interface, and the condo project risk assessment tool 204 determines an amount of risk associated with purchasing loans for units in that condo project.

In some aspects, the condo project risk assessment tool 204 can include an automatic approval path 214 for automatically determining whether loans for units within the condo project associated with the request are approved by a GSE from a project eligibility perspective associated with the system 200 based on an amount of assessed risk associated with the condo project. In some examples, the condo project risk assessment tool 204 can include an approved project database server 218 that stores a list 220 of approved condo projects as determined by a data management computing layer 208 that organizes condo project data into one or more data levels, establishes links between the data layers, and computes metrics for each of the condo projects monitored and maintained by the project risk assessment system 200. The approved project database server 218, in some examples, maintains an updated list of condo projects with an assessed risk that allows loans for units within the listed condo projects to be automatically approved for purchase. Therefore, in some examples, the condo project risk assessment tool 204 does not have to overload other servers and computing devices of the project risk assessment system 200 with simultaneous or near-simultaneous queries for individual pieces of data that are used to compute risk assessment metrics for the condo project.

In some examples, the condo project risk assessment tool 204 pulls the list 220 of approved condo projects from data management computing layer 208 on a periodic basis, such as monthly, quarterly, semi-annually, annually, etc. In other examples, the data management computing layer 208 can push updated condo project approval information to the approved project database server 218 upon receiving updated source data from external data sources, updated computations of one or more metrics, and updated condo project risk assessment determinations. In still other examples, the condo project risk assessment tool 204 can request an updated risk assessment for a condo project from the data management computing layer 208 in response to receiving a risk assessment request from a customer 210.

In some embodiments, responsive to receiving a condo project risk assessment request, the condo project risk assessment tool 204 can provide a response regarding whether loans for units within the condo project are automatically approved based on the assessed risk. In some examples, if the condo project is not automatically approved, the condo project risk assessment tool 204 can provide information to customers 210 regarding which metrics a requested condo project failed that led to the project having an increased assessed risk.

In response to receiving a condo project approval request from a customer 210, in some implementations, the condo project risk assessment tool 204 can access approval data for the condo project from the list 220 of approved projects stored at the database server 218. In some embodiments, back-end users 212 can also interface with the condo project risk assessment tool 204 via a separate web interface 216 to provide unit level exceptions for condo projects that have an assessed risk that is too high to be automatically approved based on the computed metrics. In some examples, the back-end users 212 can also access the list 220 of approved projects, which can include information regarding which metrics caused a particular condo project to not be authorized for automatic approval based on an assessed risk.

In some implementations, the project risk assessment system 200 can include a data management computing layer 208 that includes a data processing and organization component 222 and a metric computation component 224. The data processing and organization component 222, in some embodiments, gathers condo project data from one or more external data sources 228, organizes the condo project data into one or more data levels, and establishes links between the data layers. In some examples, the external data sources 228 can be the external data sources 106 described above (FIG. 1). For example, the external data sources 228 can include database servers from other organizations and computing systems within a GSE that handle different home loan and appraisal data for purposes other than condo project risk assessment but still include information that is pertinent to assessing risk associated with purchasing loans for units within a particular condo project. In some implementations, the data processing and organization component 222 includes processing resources for performing the processes of the data mining and collection engine 130, data management engine 132, event trigger engine 134, and data linkage engine 136 described above (FIG. 1). In some embodiments, the project risk assessment system 200 can also include a name resolution engine 226 that corresponds to the name resolution engine 144 described above (FIG. 1). In some examples, the name resolution engine 244 applies data scrubbing techniques to resolve naming discrepancies between condo projects and to distinguish between condo projects monitored by the project risk assessment system 108.

The metric computation component 224 of the data management computing layer 208 computes metrics for each of the condo projects monitored and maintained by the project risk assessment system 200. In some examples, the metric computation component 224 includes processing resources for performing the processes of the metric processing engine 138, threshold adjustment engine 140, and risk assessment engine 142 described above (FIG. 1). In some implementations, the metric computation component 224 generates the list 220 of approved condo projects that is pulled into the condo project risk assessment tool 204 by the approved project database server 218. In some implementations, back-end users 212 can interact with the metric computation component 224 of the database management computing layer 208 via user interface screens to monitor metric computation outputs and/or manually adjust metric thresholds.

Figure 6:
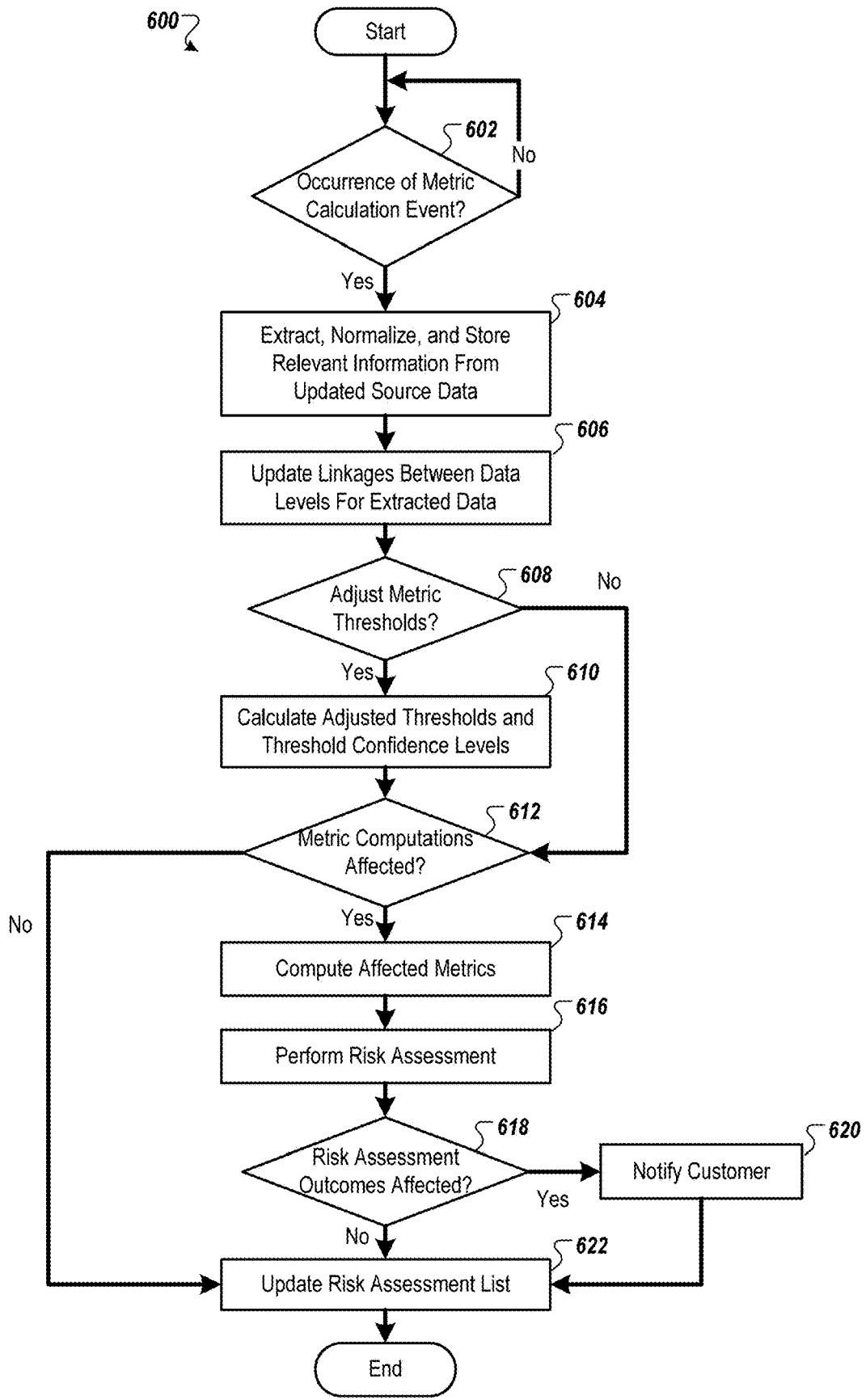
FIG. 6 is a flow chart of an example method of updating a condo project risk assessment list.

Turning to FIG. 6, a flow chart of an example method 600 for updating a condo project risk assessment list is illustrated. In one example, the project risk assessment list corresponds to the approval data 126 shown in FIG. 1 and/or condo project approved list 220 shown in FIG. 2. In some examples, the project risk assessment system 108 can perform the method 600 periodically and/or in response to receiving updated source data 128 from one or more external data sources 106. In some examples, the method 600 is performed by data management engine 132, data linkage engine 136, metric processing engine 138, threshold adjustment engine 140, and risk assessment engine 142 of project risk assessment system 108 (FIG. 1) or project risk assessment system 200 (FIG. 2).

In some implementations, the method 600 commences with detection of an occurrence of a metric calculation event (602). In some examples, a metric calculation event can include reception of updated source data 128 from one or more external data sources 106 and/or lapse of a predetermined time period for updating a condo project risk assessment list maintained by the system 108 (e.g., daily, weekly, monthly, quarterly).

If a metric calculation event has occurred, then in some embodiments, data management engine 132 extracts, normalizes, and stores the updated source data 128 in data repository 110 (604). In one example, the updated source data can include information extracted from received appraisal documentation. In some implementations, the data management engine 132 can also store each piece of extracted data within a specific data layer within data repository 110 (e.g., loan data 112, appraisal data 114, unit data 116, building data 118, project data 120). Additionally, the data management engine 132, in some examples, can normalize HOA fee information provided in appraisal documentation by subtracting out any portion of the HOA fee attributed to utility fee payments.

In some implementations, data linkage engine 136 can update linkages between data layers 112, 114, 116, 118, 120 for each condo project affected by the updated source data (606). In some examples, the data linkage engine 136 links loan data 112 to appraisal data 114 by a unique key. In some examples, the unique key may be a loan identification number or an internal project identification number created as a result of the name resolution engine 144 progressing through its address scrubbing processes. In addition, the data linkage engine 136 links appraisal data 114 to unit data 116 by a full address for the unit (e.g., street, unit number, city, and state) and links a unit data 116 to respective building data 118 by just a street portion of the address. The data linkage engine 136, in some examples, links building data 118 to respective condo project data 120 by a condo project name.

If the received source data affects one or more metric thresholds (608), then in some embodiments, threshold adjustment engine 140 can compute updated thresholds for metrics at one or more geographic size levels (610). In some examples, each of the metric thresholds is based on data distributions for the metrics in which a metric threshold is set to filter out condo projects that are outliers in the distribution. If, in some examples, the system 108 has less than a statistically significant amount of information for a metric threshold at a particular smallest geographic size level under consideration. In this case, the geographic area may be increased to a next largest area (e.g., zip code to city, city to county, to MSA, to even state) to have sufficient data points to establish a reliable threshold. The metric adjustment engine 140 may assign this larger area-based statistical threshold (e.g., percentile) for the identified larger geographic area as the metric threshold. In some implementations, the threshold adjustment engine 140 may recompute metric thresholds and confidence levels as additional source data 128 is received by the project risk assessment system 108.

If one or more metrics for any condo project monitored by the system 108 are affected by the adjusted thresholds, threshold confidence levels, and/or updated source data 128 (612), then in some examples, metric processing engine 138 can perform metric computations for any affected metrics (614). In some implementations, the metrics can include any of the metrics shown in the table 400 in FIGS. 4A-4D. For example, the metric processing engine 138 can perform metric calculations for loan-based metrics such as delinquency metric 440, LTV metric 456, and WRSI metric 458.

In some embodiments, responsive to the metric processing engine 138 computing updated metrics for one or more condo projects, risk assessment engine 142 may perform updated risk assessments for any affected condo projects (616). In some implementations, the risk assessment engine 142 assesses the risk of condo projects on a pass/fail basis.

For example, the risk assessment engine 142 can assign a respective condo project a passing score if all of the calculated metrics for the project are within an acceptable threshold range and result in a pass through all waterfall algorithms. If any of the calculated metrics is outside of a respective threshold range for a metric, then in some examples, the risk assessment engine 142 assigns a failing risk assessment score to the metric in question and also the condo project itself. In other embodiments, the risk assessment engine 142 may assign a failing score to a condo project if a predetermined number of metrics do not meet the corresponding threshold.

If an outcome of any previously computed risk assessment has changed due to the adjusted thresholds, threshold confidence levels, and/or updated source data 128 (618), then in some examples, front-end driver engine 146 may transmit a notification to a customer 102 who previously submitted a risk assessment query for the respective condo project (620). In some examples, the front-end driver engine 146 may transmit the notification via email, text message, and/or dashboard notification within a web application interface accessed by the customer 102. In some implementations, risk assessment engine 142 can update the condo project risk assessment list (e.g., approval data 126 in FIG. 1 or condo project approval list 220 in FIG. 2) to reflect any changes to risk assessments for any affected condo projects (622).

Although illustrated in a particular series of events, in other implementations, the steps of the condo project risk assessment list update process 600 may be performed in a different order. For example, updating linkages between data levels for extracted data (606) may be performed before, after, or simultaneously with calculating adjusted thresholds and threshold confidence levels (610). Additionally, in other embodiments, the process may include more or fewer steps while remaining within the scope and spirit of the condo project risk assessment list update process 600.

Figure 7A:
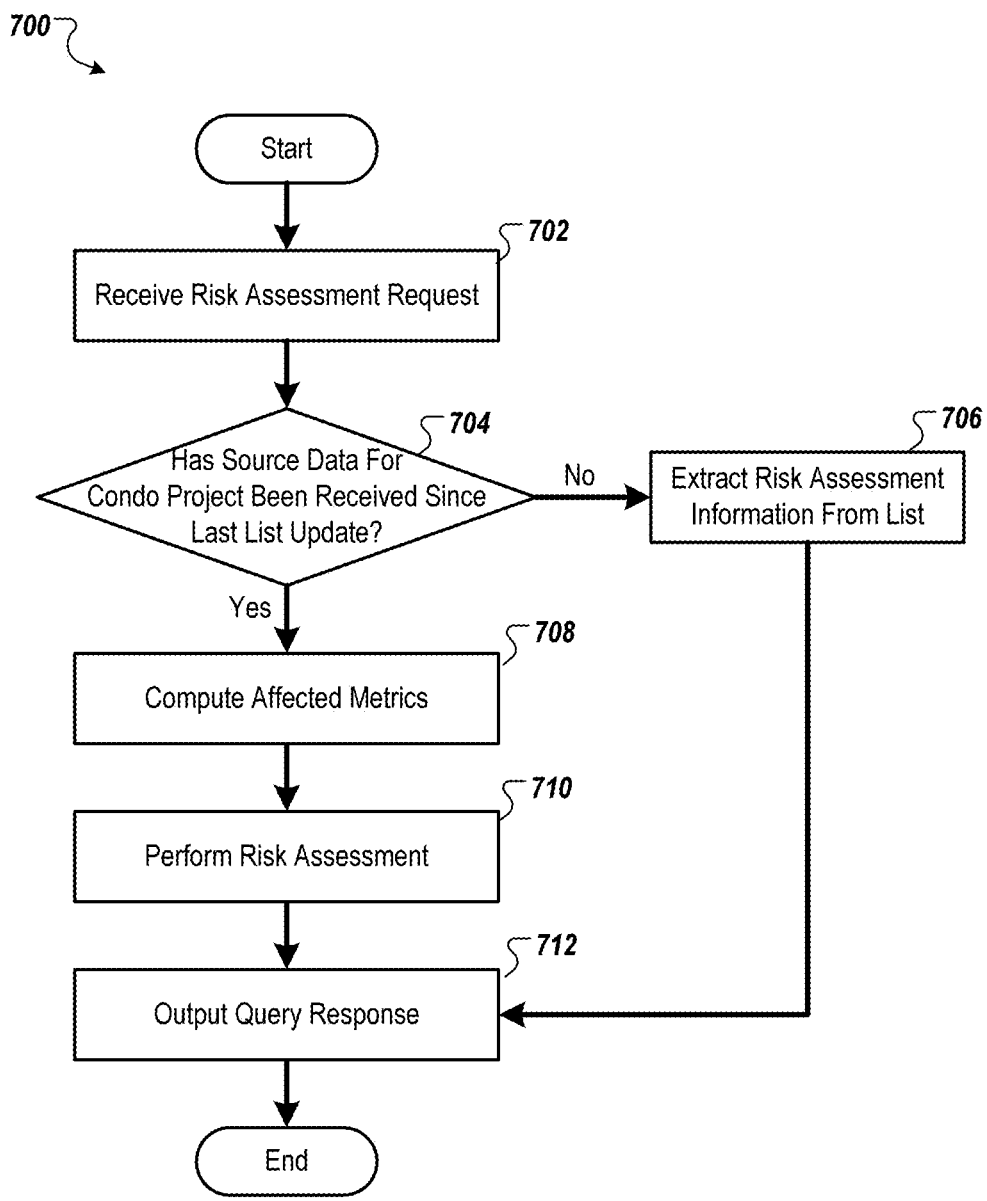
FIG. 7A is a flow chart of an example method of generating a risk assessment query response.

Turning to FIG. 7A, a flow chart of an example method 700 of generating a risk assessment query response is illustrated. In some examples, the project risk assessment system 108 can perform the method 700 in response to receiving a risk assessment query from a customer 102. In some examples, the method 700 is performed by data management engine 132, metric processing engine 138, risk assessment engine 142, and/or front-end driver engine 146 of project risk assessment system 108 (FIG. 1) or project risk assessment system 200 (FIG. 2).

In some implementations, the method 700 commences with the front-end driver engine 146 receiving a request or query from a remote computing device 158 of a customer 102 for a condo project risk assessment (702). In some examples, a customer 102 submits a request to the system 108 by providing identification information (e.g., address, condo project name) for a condo project at a user interface screen at a web application interface for the project risk assessment system 108.

In some implementations, if the system 108 has not received updated source data 128 associated with the respective condo project since a most recent condo project risk assessment list was updated (704), then in some examples, data management engine 132 extracts risk assessment information for the requested condo project from a stored condo project risk assessment list (e.g., approval data 126 in FIG. 1 or condo project approval list 220 in FIG. 2) (706). In some embodiments, when updated source data 128 is received by the system 108, the data management engine 132 applies a date tag indicating a date that the item of data was obtained from an external data source 106 and/or a date from the associated appraisal or loan documentation. The data management engine 132, in some examples, compares date tags for each item of data used to compute a metric for a condo project to the date that a most recent condo project risk assessment list was generated to determine whether new source data for the condo project has been received since the last time the condo project risk assessment list was updated.

In some examples, if the system 108 has received updated source data 128 associated with the respective condo project since a most recent condo project risk assessment list was updated (704), then in some implementations, metric processing engine 138 performs metric computations for any metrics affected by the source data 128 received since the last time the condo project risk assessment list was generated (708). In another example, system 108 may update the list of approved/not-approved projects on an auto-scheduler job that may run at a predetermined point in time, such as every two weeks. In one example, if the project risk assessment system 108 has received home sale information for one or more units in a condo project, metric processing information may recompute marketability metric (days on market versus MSA) 432 for the condo project. In some embodiments, responsive to the metric processing engine 138 computing updated metrics for one or more condo projects, risk assessment engine 142 may perform updated risk assessments for any affected condo projects (710).

In some examples, the front-end driver engine 146 outputs the risk assessment information to the remote computing device 158 of the customer 102 through a web application user interface screen (712). In some implementations, the risk assessment information can include a pass/fail or approved/disapproved result. In other examples, the risk assessment information may also include reasons for why a requested condo project received a passing for a failing score for the assessed viability or amount of risk associated with the condo project.

Although illustrated in a particular series of events, in other implementations, the steps of the risk assessment query response process 700 may be performed in a different order. For example, if a received query includes identification for more than one condo project, extracting risk assessment information from condo project risk assessment list for one condo project (706) may be performed before, after, or simultaneously with computing metrics affected by updated source data for another condo project (708). Additionally, in other embodiments, the process may include more or fewer steps while remaining within the scope and spirit of the risk assessment query response process 700.

Figure 7B:
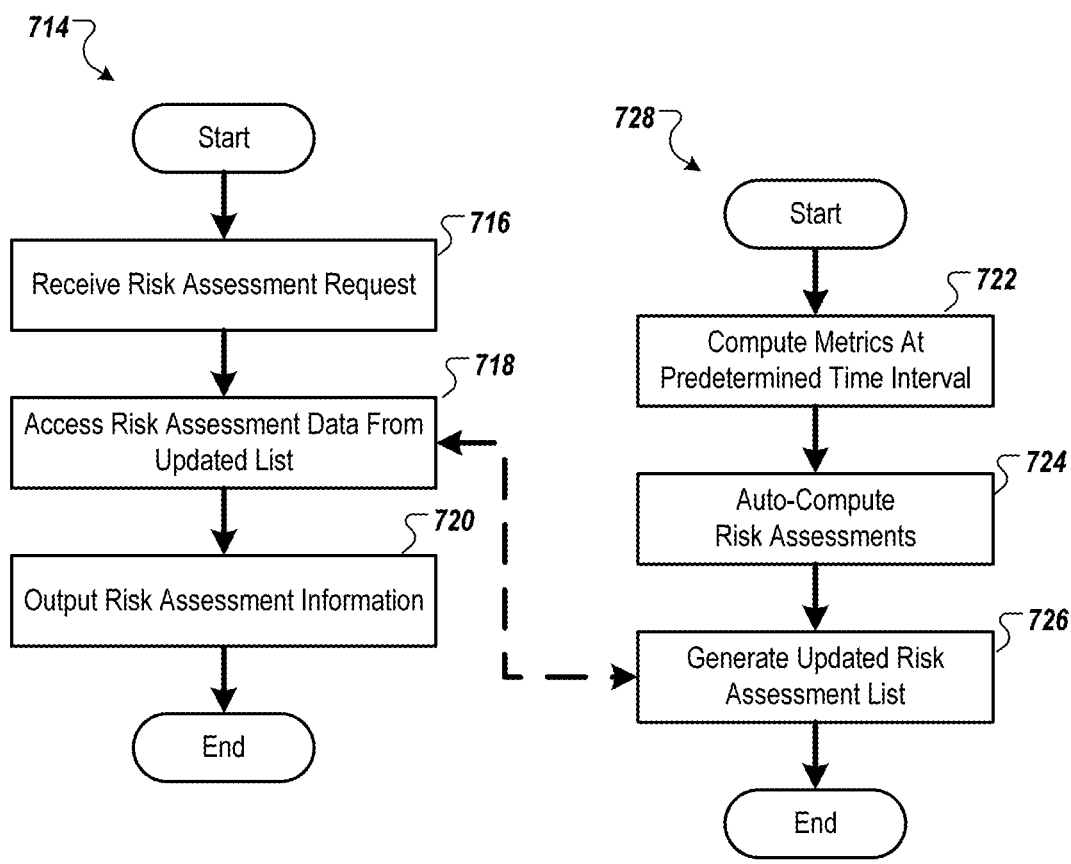
FIG. 7B illustrates flow charts of example methods of generating a risk assessment query response and performing a risk assessment.

Turning to FIG. 7B, flow charts of example methods of generating a risk assessment query response 714 and performing a risk assessment 728 are illustrated. In some examples, the methods 714, 728 are an alternative to the method 700 shown in FIG. 7A. In some examples, the project risk assessment system 108 can perform the method 714 in response to receiving a risk assessment query from a customer 102, and the method 728 is performed periodically, such as every two to four weeks. In some examples, the methods 714, 728 are performed by data management engine 132, metric processing engine 138, risk assessment engine 142, and/or front-end driver engine 146 of project risk assessment system 108 (FIG. 1) or project risk assessment system 200 (FIG. 2).

In some implementations, the method 714 commences with the front-end driver engine 146 receiving a request or query from a remote computing device 158 of a customer 102 for a condo project risk assessment (716). In some examples, a customer 102 submits a request to the system 108 by providing identification information (e.g., address, condo project name) for a condo project at a user interface screen at a web application interface for the project risk assessment system 108.

Responsive to receiving the request, in some examples, front-end driver engine 146 accesses risk assessment information for the requested condo project (718) and outputs the risk assessment information (e.g., approval information for the condo project) to an external computing device 158 of the customer 102 (720). In some implementations, the risk assessment engine 142 stores updated risk assessment lists for condo projects as approval data 126 in data repository 110 as risk assessments are performed on a periodic basis (e.g., every two to four weeks). For example, as shown in the flow chart for method 728, at the predetermined time interval metric processing engine 138 computes metrics (e.g., metrics 400-460 in FIGS. 4A-4D) (722). Based on the results of the updated metric computations, in some embodiments, risk assessment engine 142 performs risk assessments for all or a portion of the condo projects monitored by the system 108 (724) and in some examples, generates an updated risk assessment list that is stored as approval data 126 in data repository 110 (726).

Although illustrated in a particular series of events, in other implementations, the steps of the risk assessment query response process 714 and risk assessment process 728 may be performed in a different order. Additionally, in other embodiments, the process may include more or fewer steps while remaining within the scope and spirit of the methods 714, 728.

Figure 8:
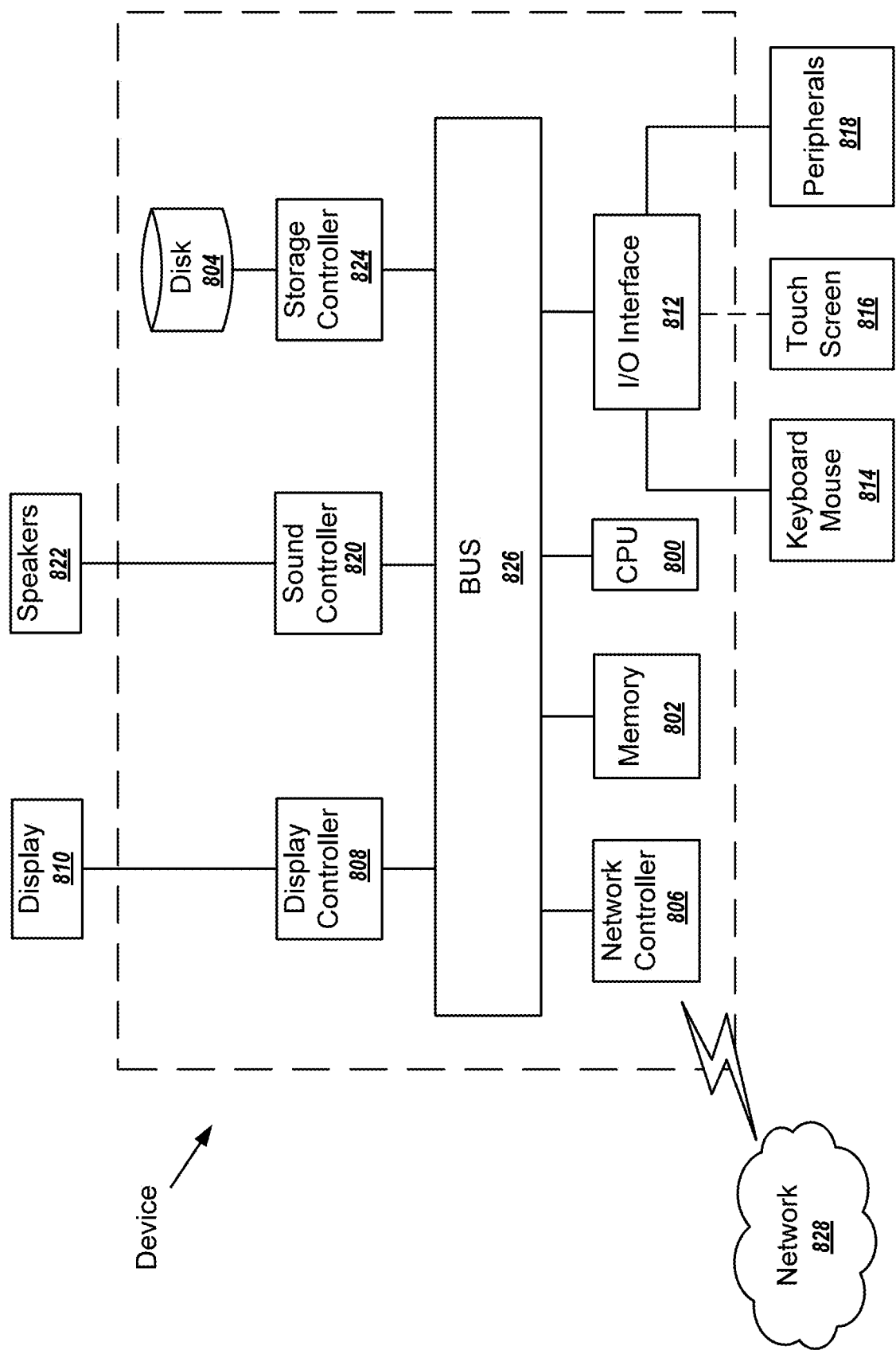
FIG. 8 is a block diagram of an example computing system.

Next, a hardware description of a computing device, mobile computing device, computing system, or server according to exemplary embodiments is described with reference to FIG. 8. The computing device, for example, may represent the customers 102, back-end users 104, external data sources 106, or one or more computing systems supporting the functionality of the project risk assessment system 108, as illustrated in FIG. 1. In FIG. 8, the computing device, mobile computing device, or server includes a CPU 800 which performs the processes described above. The process data and instructions may be stored in memory 802. The processing circuitry and stored instructions may enable the computing device to perform, in some examples, the methods 600 and 700 of FIGS. 6, 7A and 7B. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 804, in some examples, may store the contents of the data repository 110 of FIG. 1, as well as the data maintained by the customers 102, back-end users 104, and external data sources 106 prior to accessing by the project risk assessment system 108 and transferring to the data repository 110.

Further, a portion of the claimed advancements may be provided as a utility application, background daemon, or component of an operating system, or combination thereof, executing in conjunction with CPU 800 and an operating system such as Microsoft Windows 9, UNIX, Solaris, LINUX, Apple MAC-OS and other systems known to those skilled in the art.

CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The computing device, mobile computing device, or server in FIG. 8 also includes a network controller 806, such as an Intel Ethernet PRO network interface card from Intel Corporation of America, for interfacing with network 828. As can be appreciated, the network 828 can be a public network, such as the Internet, or a private network such as an LAN or WAN network, or any combination thereof and can also include PSTN or ISDN sub-networks. The network 828 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 828, for example, may support communications between the project risk assessment system 108 and any one of the customers 102, back-end users 104, or external data sources 106.

The computing device, mobile computing device, or server further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface 812 also connects to a variety of peripherals 818 including printers and scanners, such as an OfficeJet or DeskJet from Hewlett Packard. The display controller 808 and display 810 may enable presentation of user interfaces for submitting requests to the project risk assessment system 108 and displaying risk assessment results generated by the system 108.

A sound controller 820 is also provided in the computing device, mobile computing device, or server, such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device, mobile computing device, or server. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
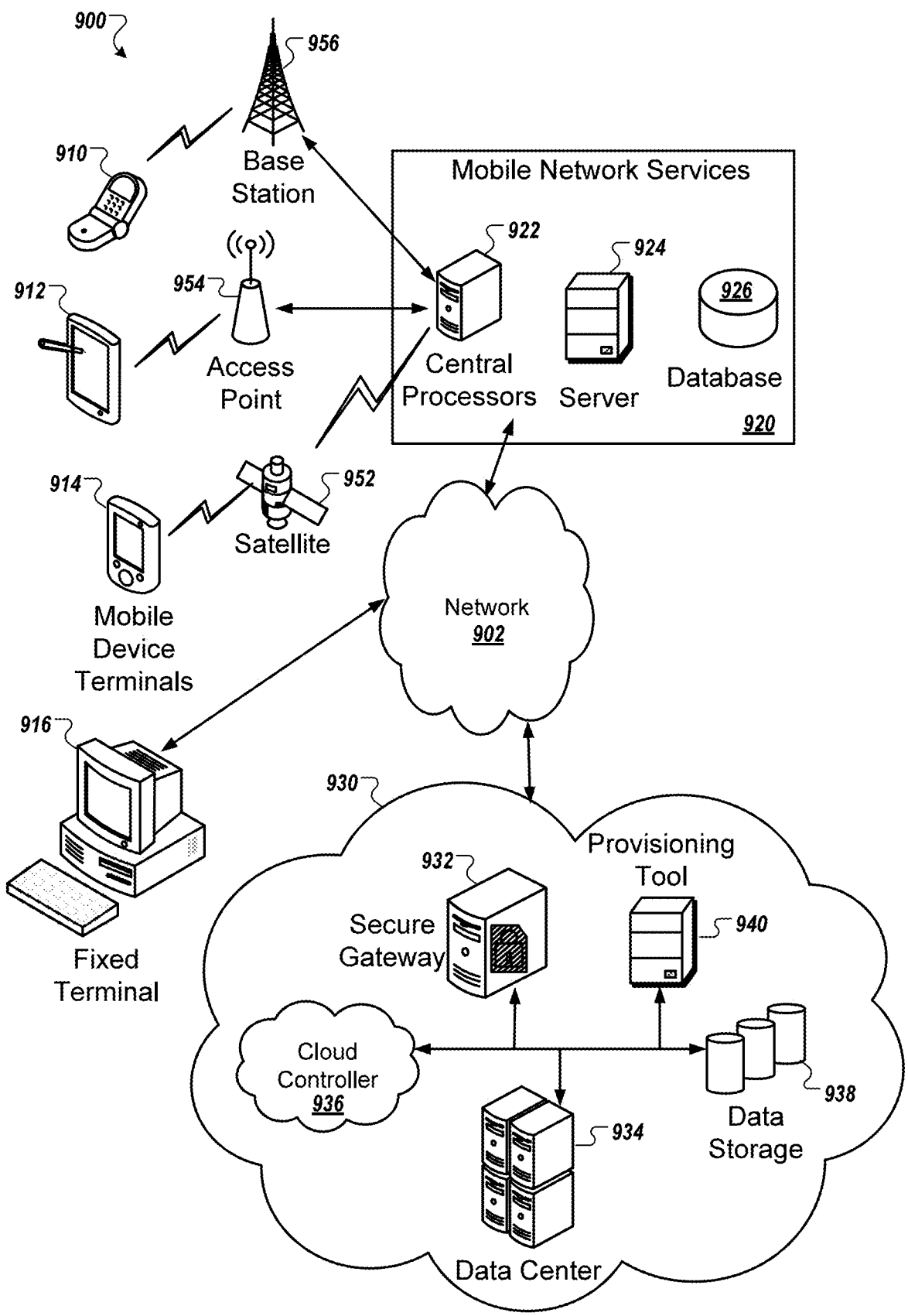
FIG. 9 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 930, such as Google Cloud Platform™ to perform at least portions of methods or algorithms detailed above. The processes associated with the methods described herein can be executed on a computation processor, such as the Google Compute Engine by data center 934. The data center 934, for example, can also include an application processor, such as the Google App Engine, that can be used as the interface with the systems described herein to receive data and output corresponding information. The cloud computing environment 930 may also include one or more databases 938 or other data storage, such as cloud storage and a query database. In some implementations, the cloud storage database 938, such as the Google Cloud Storage, may store processed and unprocessed data supplied by systems described herein. For example, request data 111, loan data 112, appraisal data 114, unit data 116, building data 118, project data 120, linkage data 122, metric data 124, approval data 126, and source data 128 may be maintained by the project risk assessment system 108 of FIG. 1 in a database structure such as the databases 938.

The systems described herein may communicate with the cloud computing environment 930 through a secure gateway 932. In some implementations, the secure gateway 932 includes a database querying interface, such as the Google BigQuery platform. The data querying interface, for example, may support access by the project risk assessment system 108 to data stored on any one of the customers 102 and back-end users 104.

The cloud computing environment 930 may include a provisioning tool 940 for resource management. The provisioning tool 940 may be connected to the computing devices of a data center 934 to facilitate the provision of computing resources of the data center 934. The provisioning tool 940 may receive a request for a computing resource via the secure gateway 932 or a cloud controller 936. The provisioning tool 940 may facilitate a connection to a particular computing device of the data center 934.

A network 902 represents one or more networks, such as the Internet, connecting the cloud environment 930 to a number of client devices such as, in some examples, a cellular telephone 910, a tablet computer 912, a mobile computing device 914, and a desktop computing device 916. The network 902 can also communicate via wireless networks using a variety of mobile network services 920 such as Wi-Fi, Bluetooth, cellular networks including EDGE, 3G, 4G, and 5G wireless cellular systems, or any other wireless form of communication that is known. In some examples, the wireless network services 920 may include central processors 922, servers 924, and databases 926. In some embodiments, the network 902 is agnostic to local interfaces and networks associated with the client devices to allow for integration of the local interfaces and networks configured to perform the processes described herein. Additionally, external devices such as the cellular telephone 910, tablet computer 912, and mobile computing device 914 may communicate with the mobile network services 920 via a base station 956, access point 954, and/or satellite 952.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system comprising:
    processing circuitry; and
    a non-transitory computer readable memory coupled to the processing circuitry, the non-transitory computer readable memory storing machine-executable instructions, wherein the machine-executable instructions, when executed on the processing circuitry, cause the processing circuitry to
        for each respective real estate entity of a plurality of real estate entities,
            extract, from source data received from a plurality of external data sources, a respective plurality of data attributes for the respective real estate entity, wherein
                the respective plurality of data attributes comprises
                    for each respective property unit of at least a portion of a plurality of property units of the respective real estate entity, wherein each respective property unit is capable of individual lease or purchase,
                        a corresponding set of one or more unit-level data attributes, each comprising at least one of address data, loan data, price data, or appraisal data, and
                    a set of one or more project-level data attributes, each comprising at least one of name data, address data, commercial space data, or construction data,
            generate, from the respective plurality of data attributes for the respective real estate entity, a respective entity data structure stored to a non-volatile storage region, wherein generating the respective entity data structure comprises
                assigning and storing each respective data attribute of the respective plurality of data attributes for the respective real estate entity to a respective data level of a plurality of data levels in the respective entity data structure, based on a correspondence between the respective data attribute and the respective data level, wherein the assigning and storing comprises
                    for each given property unit of the at least a portion of the plurality of property units of the respective real estate entity,
                        for each given unit-level data attribute of the corresponding set of one or more unit-level data attributes of the given property unit, assigning and storing, to a corresponding unit data level of one or more unit data levels of the plurality of data levels, unit-level data of the given unit-level data attribute, and
                    for each given project-level data attribute of the set of one or more project-level data attributes of the respective real estate entity, assigning and storing, to a project data level of the plurality of data levels, project-level data of the given project-level data attribute, and
                for each respective data level in the respective entity data structure, logically linking that respective data level via a corresponding unique linkage key of a respective plurality of unique linkage keys to one or more corresponding data levels in the respective entity data structure designated as adjacent to the respective data level, each unique linkage key comprising at least a portion of a data attribute of the respective data level, such that, for each respective pair of logically linked adjacent data levels in the respective entity data structure, both data levels of the respective pair of logically linked adjacent data levels are assigned a data attribute comprising the portion of the data attribute of the unique linkage key linking the respective pair of logically linked adjacent data levels, thereby defining a relationship between the data levels of the respective pair of logically linked adjacent data levels, wherein, in the respective entity data structure, the plurality of property units represented at the unit data levels are all part of a project represented at the project data level, such that each of the unit data levels is logically linked either directly or indirectly to the project data level, and at least a portion of the respective plurality of unique linkage keys each comprise at least a portion of an address, compute, from the logically linked plurality of data attributes in the respective entity data structure, risk-based metrics for the respective real estate entity, wherein each risk-based metric of the computed risk-based metrics is associated with one or more selected data levels of the plurality of data levels in the respective entity data structure, and computing each risk-based metric comprises accessing the data stored at each data level of the one or more selected data levels using a set of corresponding data attributes relevant to that respective risk-based metric, each data attribute of the set of corresponding data attributes corresponding to a respective linkage key of a set of unique linkage keys of the respective plurality of unique linkage keys, determine, in real-time based on the computed risk-based metrics, an assessed amount of risk for the respective real estate entity, and present, responsive to receiving a risk assessment request for at least one of the plurality of real estate entities from a remote computing device, the assessed amount of risk for a requested real estate entity.

2. The system of claim 1, wherein:

each real estate entity of the plurality of real estate entities is a condominium project; and for one or more of the plurality of real estate entities, the plurality of property units of each such entity comprises a plurality of condo units;

wherein the entity data structure of each such entity comprises data attributes associated with at least a portion of the plurality of condo units.

3. The system of claim 1, wherein the source data for the plurality of real estate entities includes at least one of appraisal documentation received from a first external data source of the plurality of external data sources and loan documentation received from a second external data source of the plurality of external data sources.

4. The system of claim 1, wherein the plurality of data levels comprise more than one of a loan data level, an appraisal data level, a building data level, and a project data level.

5. The system of claim 4, wherein the respective plurality of unique linkage keys comprises at least one of a loan information key comprising a loan identification number for linking the loan data level to the appraisal data level, a full location address key comprising a full address of a given property unit of the plurality of property units for linking the appraisal data level to the unit data level, a partial location address key comprising a portion of the full address of the given property unit for linking the unit data level to the building data level, and a real estate entity name key comprising a project name for linking the building data level to the project data level.

6. The system of claim 1, wherein the machine-executable instructions, when executed on the processing circuitry, further cause the processing circuitry to:

determine, based on at least a portion of the extracted source data, a respective threshold for each respective metric of a portion of the risk-based metrics, wherein each respective threshold is based on a distribution of the source data associated with each corresponding respective metric at one or more geographic locations of a subset of a plurality of geographic locations of the plurality of real estate entities.

7. The system of claim 6, wherein determining the respective thresholds for the portion of the risk-based metrics comprises determining a confidence level for each of the thresholds, wherein the confidence level for a respective threshold is based on an amount of the source data associated with the corresponding respective metric, and used to determine the respective threshold.

8. The system of claim 7, wherein the machine-executable instructions, when executed on the processing circuitry, further cause the processing circuitry to:

adjust, responsive to receiving updated source data for one or more of the plurality of real estate entities, at least one of the thresholds and an associated confidence level based on the updated source data for the one or more of the plurality of real estate entities.

9. The system of claim 6, wherein determining the thresholds for the portion of the risk-based metrics comprises determining, for each of the risk-based metrics, a plurality of thresholds, wherein each threshold of the plurality of thresholds is associated with a different geographic region size.

10. The system of claim 9, wherein the different geographic region sizes include one or more of a zip code, neighborhood, city, county, metropolitan statistical area (MSA), and state.

11. The system of claim 1, wherein computing the risk-based metrics for each real estate entity of the plurality of real estate entities comprises computing the risk-based metrics in response to detection of an occurrence of a metric calculation event.

12. The system of claim 11, wherein the metric calculation event comprises at least one of:

reception, by the processing circuitry, of updated source data for one or more of the plurality of real estate entities; and lapse of a predetermined time period for updating a previous risk assessment list for the plurality of real estate entities.

13. The system of claim 1, wherein the machine-executable instructions, when executed on the processing circuitry, further cause the processing circuitry to:

update, at a predetermined time interval, a risk assessment list indicating the assessed amount of risk for each of the plurality of real estate entities; and store, within a non-transitory database storage region, the updated risk assessment list.

14. The system of claim 13, wherein presenting the assessed amount of risk for the requested real estate entity responsive to receiving the risk assessment request comprises accessing, from the updated risk assessment list stored in the non-transitory database storage region, a respective assessed amount of risk for the requested real estate entity.

15. The system of claim 1, wherein the risk-based metrics comprise a home owner association (HOA) cost to home price ratio metric.

16. The system of claim 1, wherein computing the risk-based metrics for the respective real estate entity comprises:
comparing each computed risk-based metric to a respective threshold for the computed risk-based metric; and
assigning a pass result or a fail result to each computed risk-based metric based on the comparison of the computed risk-based metric to the respective threshold.

17. The system of claim 16, wherein assessing the amount of risk associated with the respective real estate entity comprises
approving a loan for the respective real estate entity for purchase based on the respective real estate entity receiving the pass result for a predetermined number of the computed risk-based metrics.

18. The system of claim 1, wherein a first portion of the respective plurality of data attributes is extracted from a first external data source of the respective plurality of external data sources, and a second portion of the plurality of data attributes is extracted from a second external data source of the plurality of external data sources.

19. The system of claim 18, wherein at least one pair of logically linked adjacent data levels links an attribute from the first portion of the respective plurality of data attributes to an attribute from the second portion of the respective plurality of data attributes.

20. A method comprising:
receiving, from remote computing devices of a plurality of external data sources, source data for a plurality of properties;
for each respective property of the plurality of properties, extracting from the source data, by processing circuitry of one or more computing systems, a respective plurality of data attributes for the respective property, wherein
the respective plurality of data attributes comprises
for each respective property unit of at least a portion of a plurality of property units of the respective property, each respective property unit capable of individual lease or purchase,
a corresponding set of one or more unit-level data attributes, each comprising at least one of address data, loan data, price data, or appraisal data, and
a set of one or more project-level data attributes, each comprising at least one of name data, address data, commercial space data, or construction data;
generating, by the processing circuitry from the respective plurality of data attributes for the respective property, a respective property data structure stored to a non-volatile storage region, wherein generating the respective property data structure comprises
assigning and storing each respective data attribute of the respective plurality of data attributes to a respective data level of a plurality of data levels in the respective property data structure, based on a correspondence between the respective data attribute and the respective data level, wherein assigning and storing comprises
for each given property unit of the at least a portion of a plurality of property units of the respective property,
for each given unit-level data attribute of the corresponding set of one or more unit-level data attributes for the given property unit, assigning and storing, to a corresponding unit data level of the plurality of data levels, unit-level data of the given unit-level data attribute
for each given project-level data attribute of the set of one or more project-level data attributes of the respective property, assigning and storing, to a project data level of the plurality of data levels, project-level data of the given project-level data attribute, and
for each respective data level in the respective property data structure, logically linking that respective data level via a corresponding unique linkage key of a respective plurality of unique linkage keys to one or more corresponding data levels in the respective property data structure and designated as adjacent to the respective data level, each unique linkage key comprising at least a portion of a data attribute of the respective data level, such that, for each respective pair of logically linked adjacent data levels in the respective property data structure, both data levels of the respective pair of logically linked adjacent data levels are assigned a data attribute comprising the portion of the data attribute of the unique linkage key linking the respective pair of logically linked adjacent data levels, thereby defining a relationship between the data levels of the respective pair of logically linked adjacent data levels, wherein, in the respective property data structure,
the plurality of property units represented at the unit data level are all part of a project represented at the project data level, such that each of the unit data levels is logically linked either directly or indirectly to the project data level, and
at least a portion of the respective plurality of unique linkage keys each comprise at least a portion of an address;
computing, by the processing circuitry from the logically linked plurality of data attributes in the respective entity data structure, risk-based metrics for the respective property, wherein
each risk-based metric of the computed risk-based metrics is associated with one or more selected data levels of the plurality of data levels in the respective entity data structure, and computing each risk-based metric comprises accessing the data stored at each data level of the one or more selected data levels using a set of corresponding data attributes relevant to that respective risk-based metric, each data attribute of the set of corresponding data attributes corresponding to a respective linkage key of a set of unique linkage keys of the respective plurality of unique linkage keys;
determining, by the processing circuitry in real-time based on the computed risk-based metrics, an assessed amount of risk for the respective property; and presenting, by the processing circuitry responsive to receiving a risk assessment request for at least one of the plurality of properties from a remote computing device, the assessed amount of risk for a requested property.

21. A non-transitory computer readable medium having instructions stored thereon, wherein the instructions, when executed by processing circuitry, cause the processing circuitry to:

for each respective real estate entity of a plurality of real estate entities,
    extract, from source data received from a plurality of external data sources, a respective plurality of data attributes for the respective real estate entity, wherein
        the respective plurality of data attributes comprises
            for each respective property unit of at least a portion of a plurality of property units of the respective real estate entity, wherein each respective property unit is capable of individual lease or purchase,
                a corresponding set of one or more unit-level data attributes, each comprising at least one of address data, loan data, price data, or appraisal data, and
            a set of one or more project-level data attributes, each comprising at least one of name data, address data, commercial space data, or construction data, and
    generate, from the respective plurality of data attributes for the respective real estate entity, a respective entity data structure stored to a non-volatile storage region, wherein generating the respective entity data structure comprises
        assigning and storing each respective data attribute of the respective plurality of data attributes for the respective real estate entity to a respective data level of a plurality of data levels in the respective entity data structure based on a correspondence between the respective data attribute and the respective data level, wherein assigning and storing comprises
            for each given property unit of the at least a portion of the plurality of property units of the respective real estate entity,
                for each given unit-level data attribute of the corresponding set of one or more unit-level data attributes of the given property unit, assigning and storing, to a corresponding unit data level of the plurality of data levels, unit-level data of the given unit-level data attribute, and
            for each given project-level data attribute of the set of one or more project-level data attributes of the respective real estate entity, assigning and storing, to a project data level of the plurality of data levels, project-level data of the given project-level data attribute, and
        for each respective data level in the respective entity data structure, logically linking that respective data level via a corresponding unique linkage key of a respective plurality of unique linkage keys to one or more corresponding data levels in the respective entity data structure designated as adjacent to the respective data level, each unique linkage key comprising at least a portion of a data attribute of the respective data level, such that, for each respective pair of logically linked adjacent data levels in the entity data structure, both data levels of the respective pair of logically linked adjacent data levels are assigned a data attribute comprising the portion of the data attribute of the unique linkage key linking the respective pair of logically linked adjacent data levels, thereby defining a relationship between the data levels of the respective pair of logically linked adjacent data levels,
            wherein, in the respective entity data structure,
                the plurality of property units represented at the unit data levels are all part of a project represented at the project data level, such that each of the unit data levels is logically linked either directly or indirectly to the project data level, and
                at least a portion of the respective plurality of unique linkage keys each comprise at least a portion of an address,
    compute, from the logically linked plurality of data attributes in the respective entity data structure, risk-based metrics for the respective real estate entity, wherein
        each risk-based metric of the computed risk-based metrics is associated with one or more selected data levels of the plurality of data levels in the respective entity data structure, and
        computing each risk-based metric comprises accessing the data stored at each data level of the one or more selected data levels using a set of corresponding data attributes relevant to that respective risk-based metric, each data attribute of the set of corresponding data attributes corresponding to a respective linkage key of a set of unique linkage keys of the respective plurality of unique linkage keys, and
    determine, in real-time based on the computed risk-based metrics, an assessed amount of risk for the respective real estate entity; and
present, responsive to receiving a risk assessment request for at least one of the plurality of real estate entities from a remote computing device, the assessed amount of risk for a requested real estate entity.

* * * * *